(12) United States Patent
Cronie et al.

(10) Patent No.: US 8,718,184 B1
(45) Date of Patent: May 6, 2014

(54) FINITE STATE ENCODERS AND DECODERS FOR VECTOR SIGNALING CODES

(75) Inventors: Harm Cronie, Lausanne (CH); Amin Shokrollahi, Préverenges (CH)

(73) Assignee: Kandou Labs S.A. (CH)

( * ) Notice: Subject to any disclaimer, the term of this patent is extended or adjusted under 35 U.S.C. 154(b) by 64 days.

(21) Appl. No.: 13/463,742

(22) Filed: May 3, 2012

(51) Int. Cl.
  *H04L 27/00* (2006.01)

(52) U.S. Cl.
  USPC .............. 375/295; 714/777; 375/286; 341/50

(58) Field of Classification Search
  USPC .............. 341/50, 58; 375/219, 257, 286, 296, 375/340; 714/777
  See application file for complete search history.

(56) References Cited

U.S. PATENT DOCUMENTS

| | | | |
|---|---|---|---|
| 4,486,739 A | 12/1984 | Franaszek et al. | |
| 6,556,628 B1 | 4/2003 | Poulton et al. | |
| 6,650,638 B1 | 11/2003 | Walker et al. | |
| 6,661,355 B2 | 12/2003 | Cornelius et al. | |
| 2011/0268225 A1 | 11/2011 | Cronie et al. | |
| 2011/0302478 A1 | 12/2011 | Cronie et al. | |

FOREIGN PATENT DOCUMENTS

WO 2010/031824 A 3/2010

OTHER PUBLICATIONS

Abbasfar, A. "Generalized Differential Vector Signaling," *IEEE International Conference on Communications, ICC '09*, (Jun. 14, 2009), pp. 1-5.
Dasilva, et al., "Multicarrier Orthogonal CDMA Signals for Quasi-Synchronous Communication Systems," *IEEE Journal on Selected Areas in Communications*, vol. 12, No. 5 (Jun. 1, 1994), pp. 842-852.
Slepian, D., "Permutation Modulation"; 1965, Proceedings of the IEEE, vol. 53, No. 3, pp. 228-236.
Stan, M. et al.; "Bus-Invert Coding for Low-power I/O"; 1995, IEEE Transactions on VLSI systems, vol. 3, No. 1, pp. 49-50.
Tallini, L., et al.; "Transmission Time Analysis for the Parallel Asynchronous Communication Scheme"; 2003, IEEE Transactions on Computers, vol. 52, No. 5, pp. 558-571.
Wang et al., "Applying CDMA Technique to Network-on-Chip," *IEEE Transactions on Very Large Scale Integration (VLSI) Systems*, vol. 15, No. 10 (Oct. 1, 2007), pp. 1091-1100.

*Primary Examiner* — Leon-Viet Nguyen
(74) *Attorney, Agent, or Firm* — TechLaw LLP

(57) ABSTRACT

In a chip-to-chip communication system and apparatus, a set of physical signals to be conveyed over a communication bus is provided, and mapped to a codeword of a vector signaling code using the physical signals and a state information, wherein a codeword is representable as a vector of plurality of real-valued components, and wherein a vector signaling code is a set of codewords in which the components sum to zero and for which there is at least one component and at least three codewords having different values in that component; and wherein the state information is a plurality of information present in continuous or discrete form which may have been obtained from previous codewords transmitted over the communication bus.

16 Claims, 26 Drawing Sheets

| q[i] | | | | | | b[i] | | | | v[i] values on wires | | | | | |
|---|---|---|---|---|---|---|---|---|---|---|---|---|---|---|---|
| 0 | 1 | 2 | 3 | 4 | 5 | 0 | 1 | 2 | 3 | 0 | 1 | 2 | 3 | 4 | 5 |
| 0 | 1 | 2 | 3 | 4 | 5 | 0 | 1 | 0 | 0 | -1 | 1 | 0 | 0 | 0 | |
| 1 | 0 | 3 | 4 | 5 | 2 | 1 | 1 | 0 | 1 | 0 | 0 | 0 | 0 | 1 | -1 |
| 5 | 0 | 1 | 2 | 3 | 4 | 0 | 1 | 0 | 1 | 0 | 0 | -1 | 0 | 1 | 0 |
| 2 | 0 | 1 | 3 | 5 | 4 | 0 | 0 | 0 | 0 | -1 | 0 | 0 | 0 | 1 | 0 |
| 0 | 1 | 2 | 3 | 5 | 4 | 1 | 0 | 0 | 1 | 0 | -1 | 0 | 1 | 0 | 0 |

Figure 12

| q[i] | | | | | | | | | | | b[i] | | | | | | | | | values on wires | | | | | | | | | |
|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | | 0 | 1 | 2 | 3 | 4 | 5 | 6 | 7 | | 0 | 1 | 2 | 3 | 4 | 5 | 6 | 7 | 8 | 9 |
| 2 | 8 | 0 | 1 | 3 | 4 | 5 | 9 | 6 | 7 | | 1 | 1 | 0 | 1 | 0 | 1 | 0 | 1 | | -1 | 0 | 0 | 1 | -1 | 0 | 0 | 0 | 0 | 1 |
| 0 | 4 | 1 | 2 | 5 | 6 | 7 | 8 | 3 | 9 | | 1 | 0 | 1 | 0 | 1 | 0 | 1 | 0 | | -1 | -1 | 0 | 0 | 0 | 1 | 0 | 0 | 1 | 0 |
| 1 | 0 | 2 | 3 | 4 | 6 | 7 | 9 | 5 | 8 | | 0 | 1 | 1 | 1 | 1 | 1 | 1 | 1 | | 0 | 0 | 0 | 1 | -1 | 1 | -1 | 0 | 0 | 1 |
| 4 | 6 | 0 | 1 | 2 | 3 | 7 | 8 | 9 | 5 | | 0 | 1 | 0 | 1 | 0 | 1 | 0 | 0 | | 0 | -1 | 0 | 0 | -1 | 1 | 0 | 0 | 0 | 1 |
| 4 | 1 | 0 | 2 | 3 | 6 | 7 | 8 | 5 | 9 | | 0 | 0 | 1 | 0 | 1 | 0 | 0 | 1 | | 0 | 0 | 1 | -1 | 0 | 0 | -1 | 0 | 1 | 0 |
| 3 | 6 | 0 | 1 | 4 | 5 | 7 | 9 | 8 | 2 | | 1 | 1 | 1 | 1 | 1 | 1 | 1 | 0 | | 0 | 0 | 1 | -1 | -1 | 0 | 0 | 1 | 0 | 0 |

Figure 19

| x | q[0] | q[1] | q[2] | q[3] | q[4] | q[5] | b[0] | b[1] | b[2] | b[3] | v[0] | v[1] | v[2] | v[3] | v[4] | v[5] |
|---|---|---|---|---|---|---|---|---|---|---|---|---|---|---|---|---|
| 0 | 0 | 1 | 2 | 3 | 4 | 5 | 0 | 0 | 1 | 0 | 0 | -1 | 1 | 0 | 0 | 0 |
| 1 | 1 | 0 | 3 | 4 | 5 | 2 | 1 | 1 | 0 | 1 | 0 | 0 | 0 | 0 | -1 | 1 |
| 0 | 5 | 0 | 1 | 2 | 3 | 4 | 0 | 1 | 0 | 1 | 0 | 0 | -1 | 0 | 1 | 0 |
| 1 | 2 | 0 | 1 | 3 | 5 | 4 | 0 | 0 | 0 | 0 | 1 | 0 | 0 | 0 | -1 | 0 |
| 0 | 1 | 0 | 2 | 4 | 5 | 3 | 1 | 0 | 0 | 1 | 0 | -1 | 0 | 1 | 0 | 0 |

Figure 26

FINITE STATE ENCODERS AND DECODERS FOR VECTOR SIGNALING CODES

CROSS-REFERENCES TO RELATED APPLICATIONS

The following prior applications are herein incorporated by reference in their entirety for all purposes:

U.S. patent application Ser. No. 12/784,414, filed May 20, 2010, naming Harm Cronie and Amin Shokrollahi, entitled "Orthogonal Differential Vector Signaling" (hereinafter "Cronie I").

U.S. patent application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II").

U.S. patent application Ser. No. 13/030,027, filed Feb. 17, 2011, naming Harm Cronie, Amin Shokrollahi and Armin Tajalli entitled "Methods and Systems for Noise Resilient, Pin-Efficient and Low Power Communications with Sparse Signaling Codes" (hereinafter "SPM").

U.S. patent application Ser. No. 13/176,657, filed Jul. 5, 2011, naming Harm Cronie, Amin Shokrollahi entitled "Methods And Systems For Low-Power And Pin-Efficient Communications With Superposition Signaling Codes" (hereinafter "SUPM").

U.S. patent application Ser. No. 13/421,801, filed Mar. 15, 2012, naming Harm Cronie, Klaas Hofstra, and Amin Shokrollahi, entitled "Rank-Order Equalization" (hereinafter "Cronie III").

FIELD

The present invention relates generally to the field of communications, and more particularly to the transmission of signals capable of conveying information within and between integrated circuit devices and other devices.

BACKGROUND

In communication systems, one goal is to transport information from one physical location to another, typically under some constraints, such as available time, available circuitry power, noise environments, and the number of pins bin or wires available for the transport. In most electronic communication systems, information is represented by physical quantities or values, such as electrical signals, optical signals or radio signals. The physical quantities might be, for example, voltages relative to a common ground or to some other point in a circuit, currents past a point in a circuit, a light intensity or a radio signal intensity. The communication environment (referred to herein as the "channel") may introduce or impose on the signals some unwanted noise and/or timing uncertainty. The nature of the transmitter and receiver might also introduce such noise or uncertainty. Thus, in transporting the information from a transmitter to a receiver (or in both directions between two transceivers), there are constraints that might prevent a receiver from understanding exactly what the transmitter sent.

The communication itself takes place between electronic components. Thus, information is supplied (often as digital binary data or other data) to a transmitter, the transmitter transforms the information into physical quantities (if not already received as suitable physical quantities), operates on those physical quantities in some manner and causes signals representing the information to be conveyed to the channel. The receiver receives those transmitted signals, possibly altered by noise and timing uncertainty of the channel, then operates on those signals to attempt to recover the information transmitted.

Digital information is information available in discrete units, representable as or by bits, collections of bits, selections of members of a finite set, etc. The selection of the bits or the member indicates the information. For example, where the finite set has two members, information can be conveyed—one bit at a time—by the selection of one of the members or the other. This is referred to as binary encoding or binary representation. The finite set can be larger, such as some larger power of two or even a finite integer that is not an integer power of two. For example, where the finite set has $2^8$ members, eight bits of information might be conveyed by a selection of one of those $2^8$ members.

In the general case, information that is being conveyed, or encoded, is used to make selections from among a plurality of possible valid selection options. In a very simple case, the information is in the form of bits and the plurality of possible valid selection options consists of two possible valid selection options. Conveying a zero bit is done by selecting a first of the two possible valid selection options and conveying a one bit is done by selecting the other of the two possible valid selection options.

A transmitter converts these selections into some form of signal suitable for transmission over a channel. It may be as simple as sending one voltage level over a wire for one of the possible selections and a different voltage level for each of the other possible selections. For some purposes, the selections might be referred to as logical values, digital values, bit values, levels or the like, and one of the logical values might correspond to a logical 0, another a logical 1, etc. A receiver attempts to determine, from the version of the signal it receives, and possibly other information, what selections the transmitter made, as that allows the receiver to "decode" the information that was encoded by the transmitter.

Typically binary signaling (i.e., where the plurality of possible valid selection options consists of two possible valid selection options) is simpler for the receiver to decode than non-binary signaling (i.e., where the number of possible valid selection options is greater than two). Non-binary signaling can allow for more information to be sent per selection time period, with a possible trade-off that a receiver faced with noise might have a more difficult time choosing which of the N values was transmitted as there are more possible answers. Nonetheless, non-binary signals can be useful.

In either case (binary or non-binary), it might be useful to designate one of the selections as the "logical 0" level and provide numerical values for other selections to permit sensible processing of those values. For example, the "logical 0" level might be associated with the value that the signal takes on when no current, or the minimum current, is flowing in a circuit, or when no voltage is being driven. Where there are more than two possible values, each other level might have an associated value that might correspond to a physical quantity. For these non-binary cases, the number of possible values might be three, five or an integer power of two.

For example, in the case of non-binary signaling with three levels to select from, one might draw an amount of current in one direction, another draw no current, and the third draw the amount of current but in the other direction. These might be given the values −1, 0, and 1, respectively. The values assigned to the levels might be related to a physical quantity such that values can be compared, summed, etc. in meaningful ways.

It may be that the transmitter needs to convey a certain number of bits of information in a fixed amount of time, such as 100 GB (billions of bits) per second, or 200 Mb (millions of bits) per second, or 1 billion non-binary symbols over half a second. The transmission might be divided into periods, often equally spaced, such that the information is divided into portions and each portion is sent in a period. For example, the period, T, for transmission might be T=10 ms, T=$10^{-6}$ s, T=$4 \times 10^{-9}$ s, or some other period.

A transmission rate of a communication system might be measured in bits per second, which for the periodic transmission approach described above, might be equal to the number of periods per second times the number of bits that are conveyed by the transmitter each period—this is sometimes referred to as the "bandwidth" or "capacity" of the transmitter. In some descriptions, a "symbol" refers to the signal that the transmitter conveys, or the selection the transmitter makes from the set of possible valid selections, each period. Where the transmitter only conveys one bit of information per period, the symbol used each period might be selected from a choice of two symbols. Where more bits (or other units of information) are conveyed, there might be a different number of symbols to choose from.

One constraint on a communication system is timing. In such communication systems, the transmitter is constrained to getting the signals out in one period, getting to the next period, and so on. With short periods, this can impose tight constraints on the transmitter. Often, the transmitter does not receive the information that is to be sent until just before the period in which the signals need to be sent conveying that information. In such cases, the transmitter does not have a lot of processing time. Often, higher bandwidths are preferred over lower bandwidths. However, it is typically not a simple matter to just increase bandwidth.

For example, simply changing a period of a transmission, such as by reducing the period, T, in half to double the bandwidth might create other problems. For example, timing errors might be more pronounced, physical quantities (voltage, current, etc.) from a symbol in one period might cause a disturbance in another period (inter-symbol interference, or "ISI") and that gets more pronounced as the period is shortened. It also may be that the transmitter and/or receiver cannot keep up (and might also be constrained such that the problem cannot be solved by simply throwing more circuitry at the problem and/or running more in parallel).

Another constraint is computing power. Some transmissions can be made more resilient to noise and other channel details, for example by transmitting at a higher power, or performing some complex error-correction processing. However, such operations use power in the transmitter and possibly also in the receiver. Often, a measure of efficiency is the power used per bit of information transmitted, with a preference being for being able to transmit a fixed amount of information with lower power or being for being able to transmit more information with fixed amount of power, i.e., lower power per bit is preferred, all else being the same. For fair comparisons between two communication systems, the power needed to transmit a symbol's signal is considered, but also the power needed in circuitry to process the information to arrive at the signal needs to be counted. In other words, the power consumed by circuits required to process the information from bits to symbols that can be output by a transmitter has to be taken into account when comparing circuits for generating the signals.

Yet another constraint is pin usage. Increasing the number of pins can ameliorate constraints on bandwidth and power consumption. For example, with twice as many wires in a channel, perhaps the bandwidth could be easily doubled. Also, the transmission power can be lowered per wire if signals are duplicated on additional wires, or differential signaling is used. However, this reduces the pin-efficiency ("PE"), which can be a constraint in cases where chip-to-chip communication occurs, as ICs typically have tight constraints and trade-offs as to the number of pins used for communication.

In a common communication system, the transmitter and receiver are electronic components that are present in integrated circuits ("ICs") and a communication setting is chip-to-chip communication. The communicating electronic components may be located in the same apparatus. Examples of this case are the communication between a central processing unit ("CPU") and memory inside a computer, tablet PC or other mobile device. Another example is communication between two CPU cores that are integrated on the same chip. Yet another example is the communication between a graphics processing unit ("GPU") and memory on a graphics card. In these cases, the actual communication takes place over wires on a printed circuit board ("PCB") or metal wires integrated in a chip and these wires carry electrical signals. Other examples may become apparent after reading this disclosure. The communication may, for instance, take place wirelessly or over an optical fiber.

In the general case, a channel can comprise one or more wires, subchannels, etc. to increase the aggregate bandwidth. For clarity of explanation herein, a channel will be described as comprising one or more "wires" but it should be understood that, unless otherwise indicated, where transmission is described as occurring from a transmitter to a receiver over a channel having one or more wires, the description might also be applied to transmissions over an optical channel or wireless channel having separated subchannels (perhaps by polarization, frequency, etc.). As explained below, a subchannel might comprise two wires, as with differential signaling ("DS"). A single wire or a pair of these wires may be referred to as a "channel" or "link" and multiple channels collectively might be referred to as "a communication bus" between the electronic components.

In the case of a multi-wire channel, the symbol transmitted has multiple components, one per wire used, and the act of transmitting a component on one wire might result in noise on another wire. This is sometimes referred to as inter-carrier interference ("ICI").

In some cases, communication takes place between components that are located in different apparatuses. An example of this situation is a digital photo camera that is connected to a computer. In this setting, the communication takes place over a physical cable (comprising one or several wires) or over a wireless medium. Another example is a set of computers that are connected to a network. The electronic components on a network card of each computer communicate with the electronic components of another network card of yet another computer or a router. This setting may be referred to as device-to-device communications. Unless otherwise indicated, device-to-device communications as described herein can be considered a special case of chip-to-chip communications.

As explained above, efficiency of a communication can be expressed in terms of the time it takes to transfer a certain amount of information (speed; e.g., bits/second), the energy that is required to transmit the information reliably (power consumption; e.g., joules/bit) and the number of wires required for communication (pin-efficiency; e.g., often defined in terms of a ratio of the number of bits transmitted in each time interval to the number of physical wires used to transmit those bits, i.e., bits/pin or bits/wire). In most systems, several trade-offs exist between these quantities and, depending on the application, one of these quantities might be more critical than another. A good example is the communication between a CPU and a memory in a mobile device. In that example, a battery feeds a mobile device and so the power consumption of the communication between the CPU and memory can have a large impact on the battery life. Where the device has a steady power source, such as a wall plug, power consumption may be less of an issue.

One difficulty in designing high-speed, low-power and pin-efficient communication systems lies in part in the fact that the communication channel is not perfect. First, the nature of the physical wires will mutually disturb the signals transmitted on them and noise and interference will be added to the transmitted signals. Second, the electronic components used to implement the communication system are not perfect and this may disturb the signals used for communication. These effects can be overcome, perhaps by changes that increase the power consumption per bit or that reduce the pin-efficiency, but those changes are often not desirable.

A possible method to overcome such difficulties is provided by selecting or designing appropriate signaling methods and configuring the transmitter and receiver to use such methods. Such methods might represent a mapping between the information to be transmitted (usually one or several bits) and the physical quantities on the communication wires that represent this information, i.e., the signal. A large number of signaling methods have been studied and are in use. They differ in various characteristics leading to different trade-offs between speed, pin-efficiency, power consumption, and noise immunity. Moreover, they also differ on how many wires they use simultaneously.

As an example, single-ended signaling ("SES") operates by sending a signal on one wire, whereas differential signaling ("DS") operates by sending the signal using two wires, increasing noise resilience, but reducing pin-efficiency. Simple DS can reduce the pin-efficiency by half over SES. In the case of binary transmissions, SES uses a mapping between the set $\{0,1\}$ of possible bits to two physical quantities that form a signal (e.g., voltage levels, current levels, optical levels, etc.). One of the two physical quantities might correspond to the "logical 0" value while the other corresponds to the "logical 1" value. In a common example where the physical quantities are voltages, the logical 0 might be represented by the ground-voltage and the logical 1 might then be represented by an elevated voltage level of a. The pin-efficiency of SES is 1, as one bit can be conveyed per period per wire.

With differential signaling ("DS"), the signaling method also uses a mapping between $\{0,1\}$, but here it is between $\{0,1\}$ and the set $\{(a,-a), (-a,a)\}$, wherein a is an appropriately chosen physical quantity or representative number. That mapping means that for the logical 0, the two wires of the DS pair have imposed thereon a and -a, respectively, while for the logical 1, the two wires of the DS pair have imposed thereon -a and a, respectively. DS offers significant advantages over SES, at the expense of a lower pin-efficiency of 0.5 compared to SES.

Another signaling example is "non-binary SES" wherein single-ended signaling is used but more than two possible physical quantities can be selected from. An example is PAM-signaling, which uses a mapping between the set $\{0, 1, \ldots, 2^k-1\}$ for some k>1 and a set of $2^k$ distinct physical quantities of which one can be regarded as a logical 0. In this case, each wire carries k bits of information, thus providing a pin-efficiency of PE=k. However, to obtain reasonable immunity against noise, since the receiver must now differentiate more detail than just the choice between two possibilities, the physical quantities might need to be more distinct, such as having larger voltage differences between various levels. For example, where binary SES has two levels, non-binary SES with k=2 would have four levels and k=4 would have sixteen levels. Thus, while PAM-signaling might provide higher pin-efficiency, PAM-signaling creates other issues. Note, there may also be non-binary SES where the number of levels is not an integer power of two, but similar concerns apply there as well.

There are a number of signaling methods that maintain the desirable properties of DS while increasing pin-efficiency over DS. Many of these attempts operate on more than two wires simultaneously, using binary signals on each wire, but mapping information in groups of bits. For example, a communication system might, for some k>1, map each k information bits of the set $\{0,1\}^k$ to a set C comprising $2^k$ codewords. Each codeword might have the same length and if that length is less than 2k, the pin-efficiency would be greater than 0.5. For example, each component might be conveyed on one of N wires and have coordinates belonging to a set $\{a,-a\}$ so that each of the N wires has a binary signal. For simple "repetitive" DS, the DS signals are applied independently to pairs of wires, so number of wires (N) would be 2k. This mapping (with N<2k) can provide a higher pin-efficiency relative to DS. Also, unlike "repetitive" SES, the set C does not contain all possible vectors of the given length. Some of these methods are described in [Cornelius] and [Poulton].

Vector signaling is a method of signaling. With vector signaling, a plurality of signals on a plurality of wires are considered collectively although each of the plurality of signals might be independent. Each of the collective signals is referred to as a component and the number of plurality of wires is referred to as the "dimension" of the vector. In some embodiments, wherein the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

With binary vector signaling, each component takes on a coordinate value (or "coordinate", for short) that is one of two possible values. As an example, eight SES wires might be considered collectively, with each component/wire taking on one of two values each signal period. A "codeword" of this binary vector signaling is one of the possible states of that collective set of components/wires. A "code set" or "vector set" is the collection of valid possible codewords for a given vector signaling encoding scheme.

Stated mathematically, binary vector signaling maps the information bits of the set $\{0,1\}^k$ for some k>1 to a vector set, C, comprising $2^k$ vectors. Each vector might have the same dimension, N, and that dimension (i.e., number of components) might be greater than k but less than 2k (resulting in a the pin-efficiency above 0.5). A "binary vector signaling code" refers to a mapping and/or set of rules to map information bits to binary vectors.

With non-binary vector signaling, each component has a coordinate value that is a selection from a set of more than two possible values. Examples of non-binary vector signaling are presented in Cronie 1, Cronie II, SPM and SUPM.

A "non-binary vector signaling code" refers to a mapping and/or set of rules to map information bits to non-binary vectors. Stated mathematically, given an input word size, k>1, given a finite set, S, of three or more values (possibly corresponding to, or representable by, values that might correspond to physical quantities as explained herein, wherein the values are preferably real numbers), and given a vector dimensionality, N, non-binary vector signaling is a mapping between $\{0,1\}^k$ and a vector set, C, where C is a subset of $S^N$. In specific instances, there is no proper subset T of S such that C is a subset of $T^N$, i.e., over the vector set C, there is at least one component (coordinate position) in which each of the values of finite set S appears. For S being a finite set of three values, that means that there will be at least one coordinate position for which at least three codewords all have different values.

Some vector signaling methods are described in Cronie I, Cronie II, SPM, and SUPM. For example:
(1) orthogonal differential vector signaling is described, wherein the set C is obtained as the Hadamard-transform images of vectors of length k with coordinates $\{+1, -1\}$;
(2) permutation modulation codes are described, wherein the set C is obtained by taking the set of all vectors obtained from all permutations of a fixed vector;
(3) sparse signaling codes are described, wherein the set C is the set of all vectors obtained from all permutations of a fixed vector in which many coordinates are zero (or a fixed number); and
(4) superposition signaling codes are described, wherein the set C may be obtained as a set-wise sum $C_1+C_2+\ldots+C_l$ wherein $C_1, C_2, \ldots, C_l$ may be (sparse) signaling codes, or more generally, permutation modulation codes.

While non-binary vector signaling methods can provide substantial improvements regarding the tradeoff of pin-efficiency, power efficiency and noise resilience as compared to traditional signaling methods, there are some applications wherein additional improvements are possible, and sometimes necessary.

REFERENCES

[Cornelius] U.S. Pat. No. 6,661,355 to Cornelius, et al., entitled "Methods and Apparatus for Constant-Weight Encoding and Decoding" issued Dec. 9, 2003.
[Franaszek] U.S. Pat. No. 4,486,739 to Franaszek, et al., entitled "Byte Oriented DC Balanced 8B/10B Partitioned Block Transmission Code" issued Dec. 4, 1984.
[Poulton] U.S. Pat. No. 6,556,628 to Poulton, et al., entitled "Methods and Systems for Transmitting and Receiving Differential Signals over a Plurality of Conductors" issued Apr. 29, 2003.
[Walker] U.S. Pat. No. 6,650,638 to Walker, et al., entitled "Decoding Method and Decoder for 64b/66b Coded Packetized Serial Data" issued Nov. 18, 2003.

BRIEF SUMMARY

In a chip-to-chip communication system, data is transmitted over a plurality of transmission wires by receiving a plurality of bits representing the data to be transmitted, generating a vector signaling code codeword based on the received plurality of bits and a stored state, wherein the vector signaling code codeword is a codeword in a vector signaling code wherein comprises a finite set of vectors with entries being real numbers such that the sum of the coordinates of each codeword is a constant over the finite set of vectors and where, for at least one coordinate position, at least three codewords have values in that position distinct from the values of others of the at least three codewords, updating the stored state for a time instance, such that the updated stored state is usable in generating a subsequent vector signaling code codeword dependent at least on that updated stored state, and outputting a representation of the codeword over the plurality of transmission wires in each of a plurality of periods. A corresponding receiver can be used.

In particular embodiments, coding for multiple wires in a chip-to-chip or device-to-device communication system is combined with a state of the transmission. In some embodiments the state information is updated with every transmission over the multiple wires, whereas in other embodiments the state information may be updated with every second, every third, or in general every t-th transmission wherein t may be any positive integer.

In some embodiments, the state information is used to enforce transition of state on each transmission wire, thereby relaxing constraints on the electronic components used for driving the wires and those components used for receiving and estimating the signals on each individual wires.

In yet other embodiments, hybrid methods are disclosed which limit the amount of transitions on the wires and/or guarantee the existence of transitions within a prescribed time interval.

BRIEF DESCRIPTION OF THE DRAWINGS

FIG. 12 is an example of relevant values when an embodiment of a transition limited coding scheme is used.
FIG. 19 is an example of relevant values when an embodiment of a transition limited coding scheme is used.

FIG. 26 is an example of relevant values when an embodiment of a transition enforcing coding scheme is used.

DETAILED DESCRIPTION

Various embodiments of communication systems, transmitters, receivers, and methods for transmitting and receiving over various types of channels are described herein. Various examples herein are not meant to be limiting.

In the typical example, information is represented by physical quantities or values, such as electrical signals, optical signals or radio signals and a transmitter receives that information in electronic or electrical form and generates a signal that it sends to a channel, typically periodically. The channel may introduce or impose on the signals some unwanted noise and/or timing uncertainty. That might cause the receiver to misinterpret the signal.

Eye diagrams represent a received periodic signal where the signal over various periods are overlaid. One measure of performance of a high speed chip-to-chip or device-to-device communication system is the eye-diagram of the received waveforms, possibly after additional processing. The eye diagram corresponds to an oscilloscope display in which the signal is repetitively sampled and applied to the vertical axis, whereas the horizontal axis measures the time. Where the signal has a certain value for the duration of a period and then changes (or not) to the certain value for the next period, the signal appears in the same place as a similar symbol from another period. The eye diagram gives one illustration of how easy or hard it is for the receiver to correctly determine the sent signal.

Figure 1:
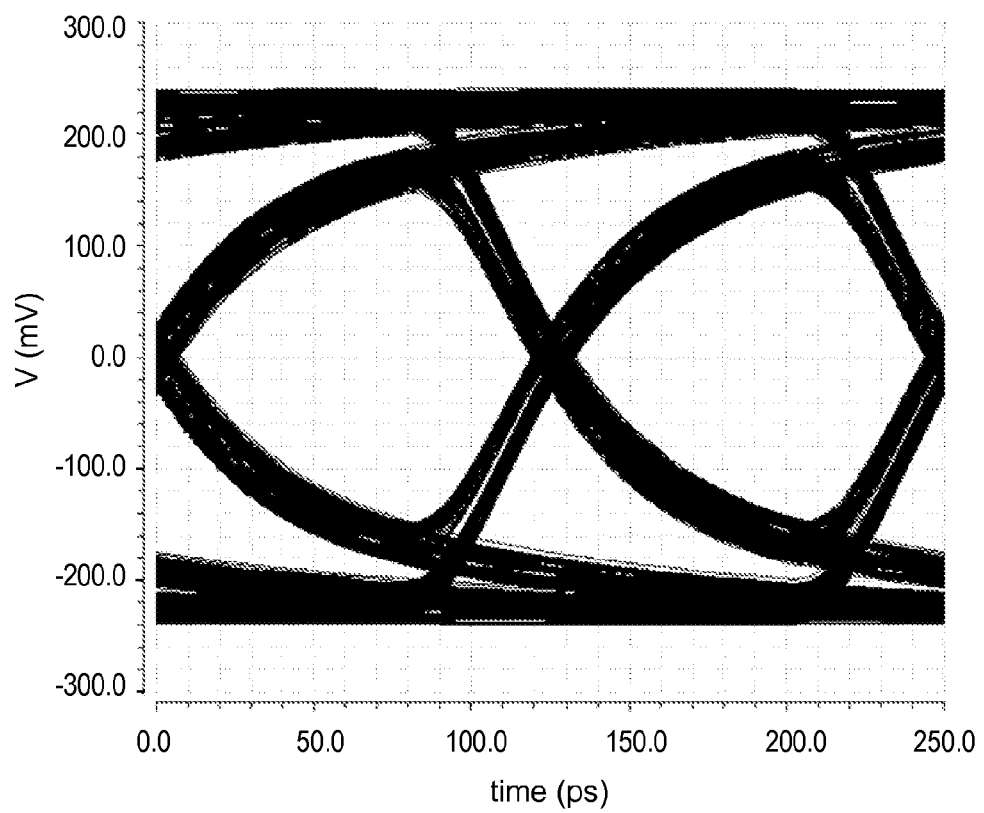
FIG. 1 is an example of a possible eye diagram when using single-ended signaling.

FIG. 1 is an example of a possible eye diagram when using single-ended signaling and binary signals, showing instances where the signal transitions from one logical value to the other, as well as signal transitions from period to period where the logical value is the same from one period to the next. As should be apparent from FIG. 1, if a sampling time is suitably selected, a receiver can correctly determine whether the signal in a particular period is a logical 0 or a logical 1. This is because there is not too much variance in amplitude or timing of the signal from period to period, i.e., the "eye" is open wide.

Figure 2:
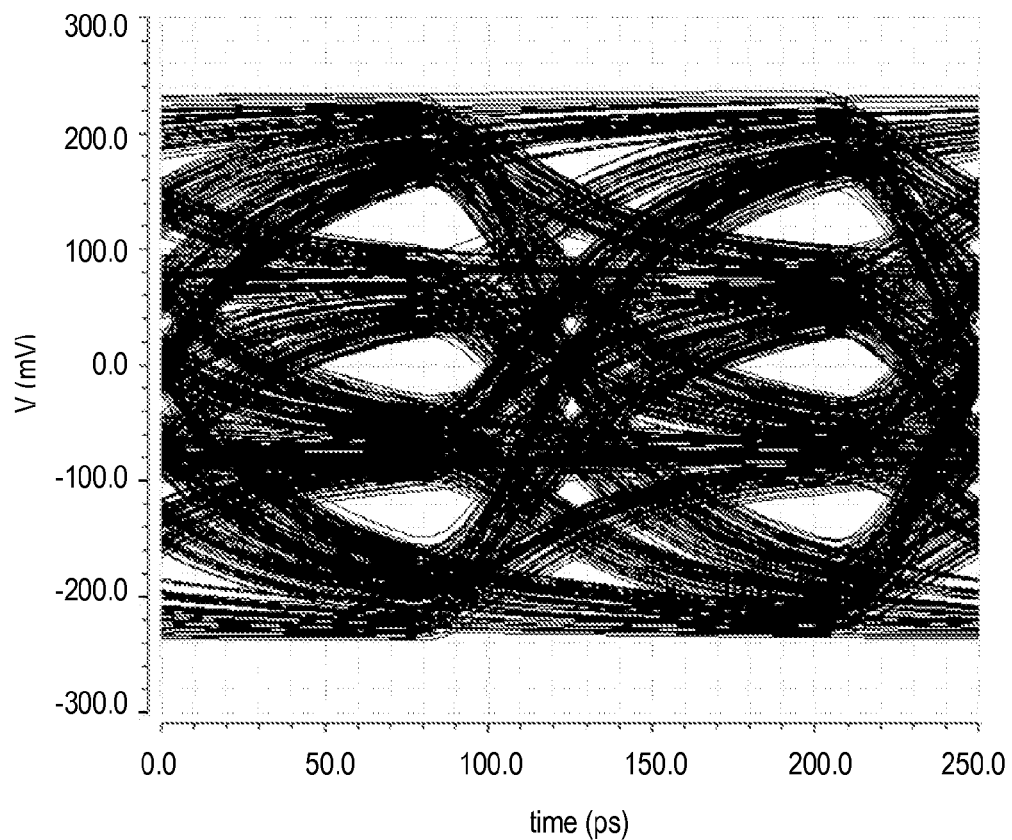
FIG. 2 is an example of a possible eye diagram when using PAM-4 signaling in the presence of noise.

FIG. 2 is an example of a possible eye diagram when using PAM-4 signaling in the presence of noise. With PAM-4, there are four valid levels (i.e., k=2) and if the receiver were to sample the signal at 80 ps and 210 ps, the receiver might be able to correctly distinguish among levels. However, as should be apparent, while there are twice as many bits being sent per unit time relative to the SES of FIG. 1, there is much less of a margin of error, due in part to the levels being closer together and due in part to the presence of noise. In this example, the sampled signals are not very clean and the corresponding communication link may experience severe problems.

Figure 3:
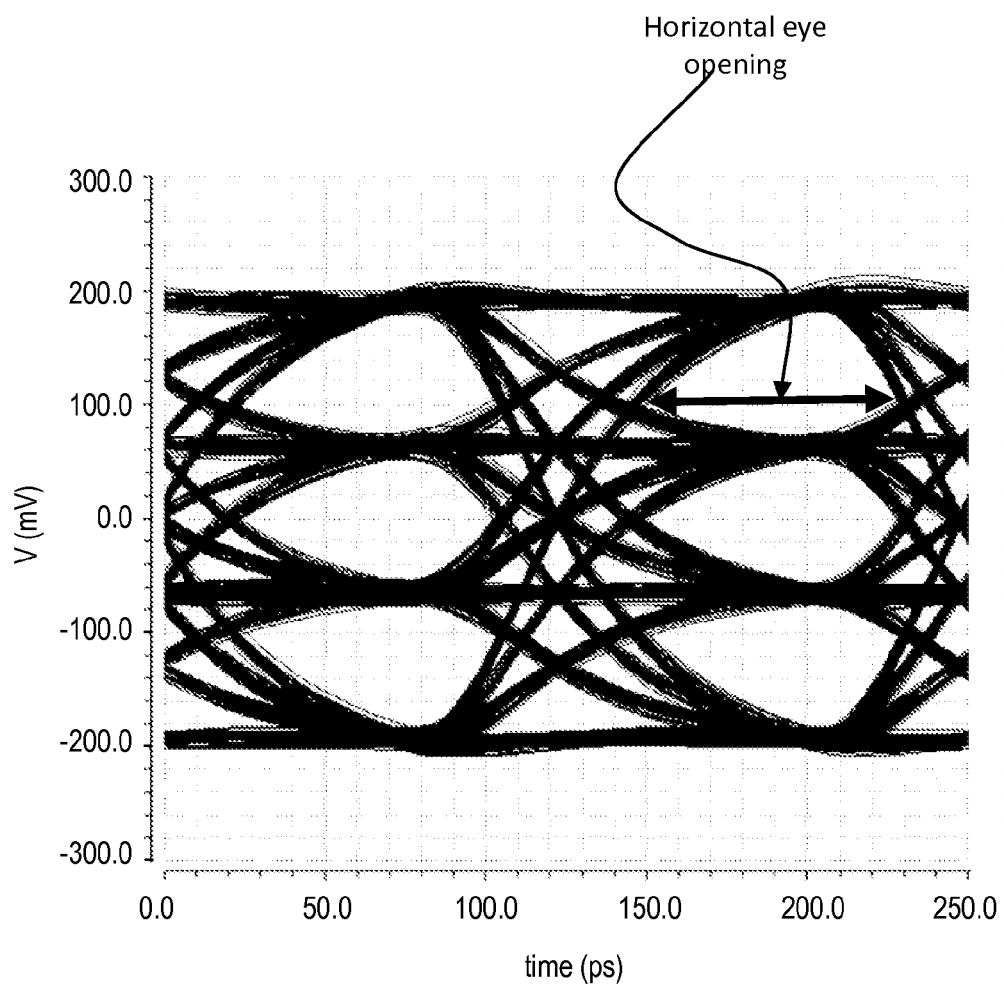
FIG. 3 is an example of a possible eye diagram when using PAM-4 signaling on a clean transmission medium.

FIG. 3 is an example of a possible eye diagram when using PAM-4 signaling on a clean transmission medium. Note that there is much les noise relative to the eye diagram of FIG. 2 and the larger horizontal eye opening means that the timing of sampling at the receiver is not as critical as would be the case for the eye diagram of FIG. 2.

Figure 4:
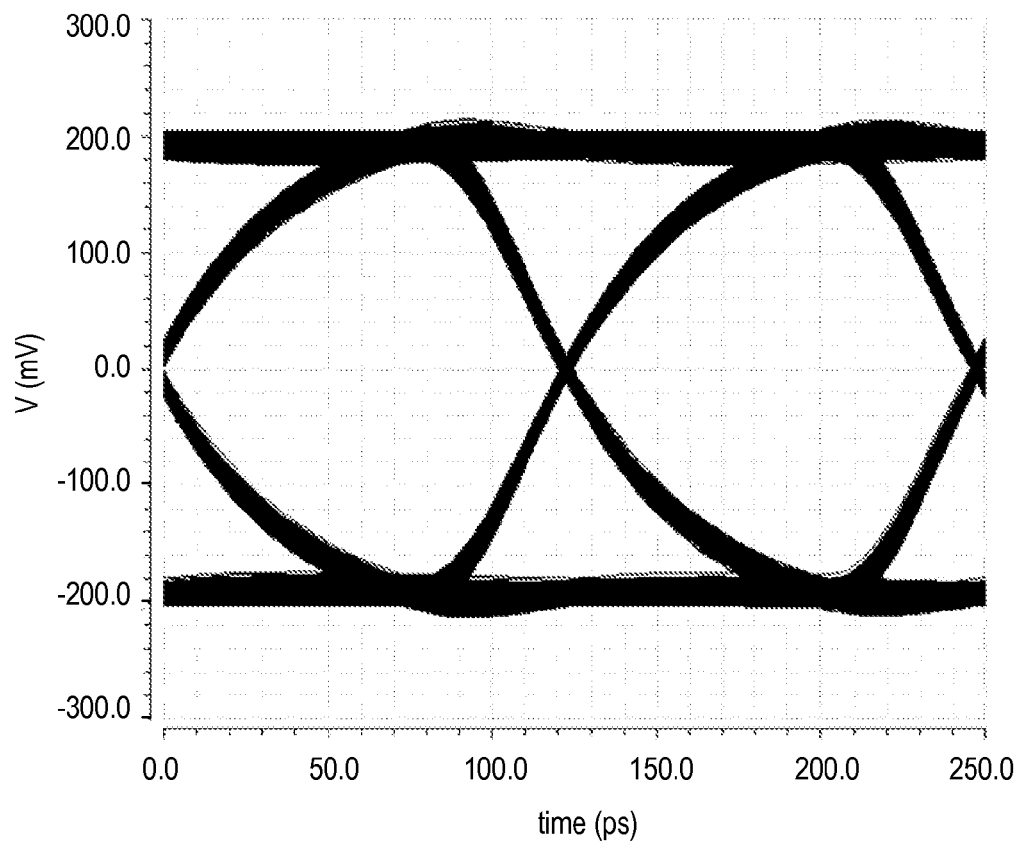
FIG. 4 is an example of a possible eye diagram when using differential signaling.

FIG. 4 is an example of a possible eye diagram when using differential signaling. Though this is only a schematic, in applications the eye diagram of DS is typically much better than that of SES, even if a faster clock signal has to be used to maintain the same data throughput (because of the lower pin-efficiency).

As can be seen in FIG. 3, the horizontal eye opening of a PAM-signal may be substantially smaller than the same opening when using DS, as in FIG. 4, which may have adverse effects as it calls for the use of more precise clocks to reduce the error rate of the system. While there may be different reasons for a reduction of the horizontal eye opening in practice, one of the primary reasons for this reduction is the existence of transitions between states that are far apart. A circuit can typically transition from one voltage/current/etc. level to another one more quickly if they are closer together, but take longer for transitions that are farther apart. For example, in FIG. 3, if a wire is in the lowest state (with the states from lowest to highest being referred to as "state 0, state 1, state 2, state 3"), and a transition is to be made from state 0 to the top state, state 3, then this transition typically takes more time than a transition from state 0 to the next higher state, state 1. The amount of time it takes to complete the transition has a direct effect on the reduction of the horizontal eye opening.

As explained more below, the quality of a system using PAM signaling can be improved by limiting the amount/size/number of such transitions. This introduces a temporal aspect to signaling, wherein the symbol sent in a current period that depends on the information bits to be sent in that current period may also depend on what symbols were sent in previous periods. In some instances, this can reduce the number of transitions of signal values on the different wires, which sometimes may be desirable. The temporal aspect can be applied to vector signaling methods using non-binary signals.

In some instances, it may be advantageous to force transitions on wires within every given interval of time, wherein the length of the interval may depend on applications.

It has been known to force transitions when using traditional binary signaling methods. For example, [Franaszek] describes mapping 8-bit symbols to 10-bit symbols to achieve DC-balance and bounded disparity, using the well-known 8b/10b encoding. [Walker] describes the 64b/66b packetized serial data code which encodes 64 bits into a frame of 66 bits, which achieves similar advantages as the 8b/10b code, but at a substantially higher rate. In all these applications, a minimum number of transitions is guaranteed; in addition to DC-balance, such transitions may also allow for efficient methods of clock recovery in high speed systems.

As explained herein, this type of transition forcing (and other types of transition forcing, or limiting as described herein) can be used with vector signaling, by using temporal vector signaling. With temporal vector signaling, for a given period, the set of possible codewords of the underlying vector signaling code might be limited to a subset of codeword and the bounds of the particular subset might depend on a partial history of transmitted codewords.

In some cases, the vector signaling code is a constant-sum vector signaling code, in that for the vector set C, the sum of the coordinate values of the components of every vector is a constant over all members of C. The sum could be the arithmetic sum of the values assigned to different selections. For example, where the finite set S is {−1, 0, +1}, the values for each component might be summed. In some cases, the sum for all of the vectors is some nonzero value, but for others, the sum for all of the vectors is zero. For example, given a vector such as v=(0, +1, +1, −1, 0, 0, 0, −1), the sum for that vector would be zero. If the sum is the same for all valid vectors, the code is referred to as a constant-sum vector signaling code. Herein, a constant-sum vector signaling code that is also a non-binary vector signaling code is referred to as a constant-sum non-binary vector signaling code, or a "CSNBV" signaling code. CSNBV signaling methods provide improvements regarding the tradeoff of pin-efficiency, power efficiency and noise resilience as compared to traditional signaling methods, as explained herein.

In some CSNBV signaling codes, and possibly others, each codeword includes at least one repeated component, i.e., for each vector, there are at least two components that have the same component value. For example, the vector v=(0, +1, +1, −1, 0, 0, 0, −1) has more than one component with a value of +1.

A "weight" of a codeword refers to the number of nonzero components, i.e., the number of components that do not have the value assigned to logical 0. In the case of the vector v, its weight is four.

Figure 5:
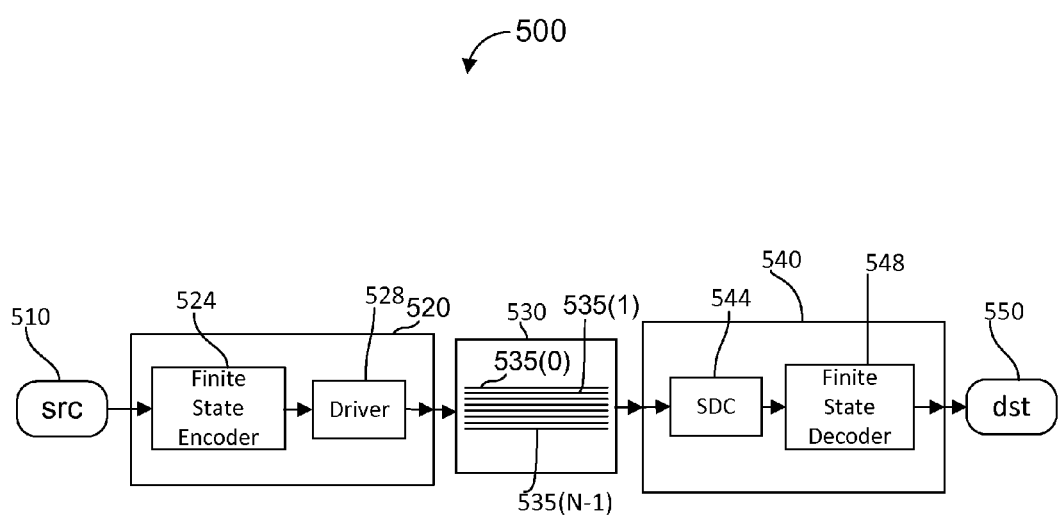
FIG. 5 is a schematic overview of a communication system that might use elements of the present invention.

FIG. 5 is a high-level block diagram of a communication system 500 over which aspects of the present invention might be used. As explained above, the communication system moves information from a source to a destination, where the information is representable in digital form at the source and destination and is conveyed over a channel having one or more wires or subchannels, and received by a receiver. The signals are sent as symbols in channel periods. Thus, in communication system 500 shown in FIG. 5, a transmitter 520 receives digital information from a source 510 and conveys it over a bus 530 to a receiver 540 to be supplied to a destination 550. It should be understood that source 510 and destination 550 can be some sort of electronic source/destination, such as a processing circuit of a chip that needs to send or receive information from another processing circuit on another chip, devices that communicate or other examples.

Bus 530 is shown comprising a plurality of wires 535 (or "subchannels"). In a typical case, transmitter 520 sends one signal per transmission period, T, per wire (collectively, a "symbol"). The signal can comprise some physical quantity (voltage, current, optical signal, etc.). In doing so, transmitter 520 consumes some electrical power and has some method of connecting to wires 535 individually. In the case of chip-to-chip communications, the transmitter may use chip pins to electrically connect to wires 535, in which case if there are N wires to be used, a chip would have to allocate at least N pins to the transmission process.

As illustrated in FIG. 5, transmitter 520 also includes a finite state encoder 524 and a driver 528, while receiver 540 also includes a signal-to-digital converter ("SDC") 544 and a finite state decoder 548. The finite state encoder and decoder are explained in more detail below, but with these elements, a temporal aspect of vector signaling can be implemented.

In some applications, destination 550 might be co-located with receiver 540 and in some applications, transmitter 520 and receiver 540 are bi-directional.

An example of bus 530 is a bus between a processor and memory. In this example, the physical wires may take the form of striplines or microstrips on a PCB. Another example of bus 530 is a set of wires connecting two different devices.

In this disclosure, most of the examples refer to communication buses where the wires carry electrical signals. However one of ordinary skill in the art, upon reading this disclosure, should recognize that the methods disclosed below are not limited to electrical signals only. The methods may readily be applied in other settings, such as that of optical communications. In the case of optical channels, wires might be replaced by fiber or other media.

In communication system 500, this temporal constraint can be implemented in that the encoder and decoder maintain a finite state to remember a partial history needed to decide which vector signaling codeword to transmit next. In communication system 500, information source 510 might provide a sequence of k information bits per period, T, to transmitter 520. More specifically, source 510 supplies a sequence of k bits every T seconds to finite state encoder 524, which is a finite state vector signal encoder. In the i-th time interval of T seconds, finite state encoder 524 maps these k bits to a vector $c_i$ of size N wherein this vector belongs to the vector signaling code set C used by communication system 500. As mentioned above, various vector signal encoders may be applied. In some embodiments, the information symbols may be bits, but other digital representations of information symbols as described above are also permissible. For clarity, examples herein use bits, but extensions should be understood.

The vector $c_i$ is then supplied to bus driver 528, which generates a sequence of N continuous signals $x_0(t)$ to $x_{N-1}(t)$ for each of the N bus wires 535 (referred to herein as wire 535(0), wire 535(1), . . . , wire 535(N−1)). In an embodiment, for each single wire j, where 0≤j≤N−1, serial pulse-amplitude modulation ("PAM") is used to modulate the message $c_i[j]$, wherein $c_i[j]$ is the j-th component of the vector $c_i$. In the general case, time is divided into periods of T seconds, where T is the symbol length in seconds, i.e., the duration of time in which a symbol is transmitted over bus 530, and for each i-th period T on each of N wires, some signal of some pulse shape is conveyed according to the codeword or codewords used for the period. Thus, globally, a form of vector pulse amplitude modulation is applied by bus driver 528.

In the example illustrated, the signals $x_0(t)$ to $x_{N-1}(t)$ may be transmitted by bus driver 528 as currents or voltages on the wires of the bus, or other physical quantities. These currents or voltages can induce electromagnetic waves that traverse bus 530. Bus driver 528 may also perform additional tasks, such as amplification, pre-emphasis, equalization, and filtering before actual transmission on the bus. At the receiver side, a set of signals $y_0(t)$ to $y_{n-1}(t)$ is present and these are sensed by SDC 544. In the presence of noise, these signals, y(t), might not exactly equal the original set of signals, and so SDC 544 may perform additional tasks such as amplification, equalization, and filtering, to obtain reliable estimates of the signals sent by bus driver 528. These methods may generic or tailored to the particular vector signaling code used, as taught in Cronie III, for example.

Figure 6:
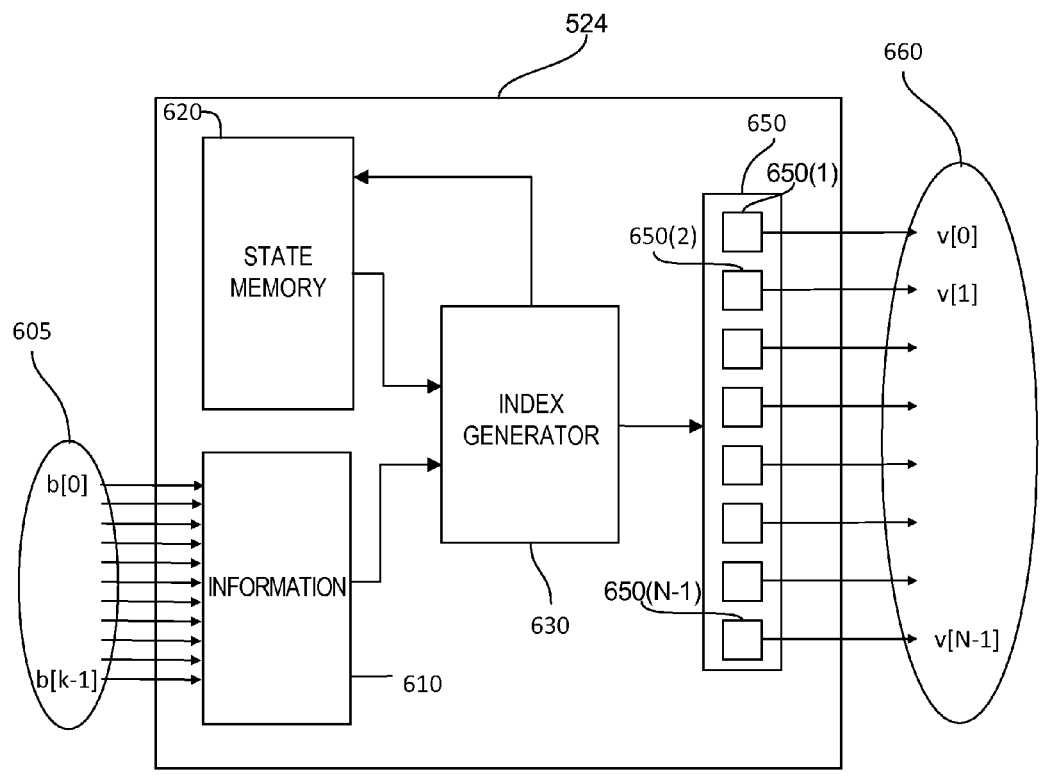
FIG. 6 is an exemplary illustration of a finite state encoder as might be used in the communication system shown in FIG. 5.

FIG. 6 illustrates an example embodiment of finite state encoder 524. Finite state encoder 524 comprises an input for bits b[0], . . . , b[k−1], collectively denoted as 605, an information unit 610, an index generator 630, a state memory unit 620, and additional memory units 650. Information unit 610 is coupled to input 605, as well as index generator 630, which is in turn coupled to state memory unit 620 and additional memory units 650. Additional memory units 650 are coupled to encoder outputs 660 referenced as v[0], . . . , v[N−1].

Information unit 610 receives bits b[0], . . . , b[k−1] and forwards them to index generator 630. Index generator 630 calculates additional information based on these bits and based on information it receives from state memory unit 620.

The additional information computed by index generator 630 depends on the particular vector signaling code used. For example, where a sparse signaling code as defined in Cronie II or in SPM is used, index generator 630 may compute the positions of the nonzero coordinates of a codeword of the code, together with the values or an indication of these values. The information produced by index generator 630 is forwarded to additional memory unit 650, which then produces values v[0], . . . , v[N−1], collectively denoted by 660, which is forwarded to bus driver 528 (see FIG. 5) for further processing.

In some embodiments, there might be substantially fewer values v[i] used than there are wires, i.e., if there are N wires in bus 530, fewer than N v[ ] values might be in use.

One task of state memory unit 620 is to keep store a partial history of the codewords of the vector signaling code that have been transmitted in the past, or an indication of such partial history, which will enable index generator 630 to produce the next codeword based on this information (and the bits 605). It therefore provides a temporal correlation between successive codewords sent by communication system 500 so as to ameliorate the reliability of the received signals as discussed above. Details of specific operations of state memory unit 620 and how its state is used by index generator 630 can depend on the particular application; several examples are described below.

Figure 7:
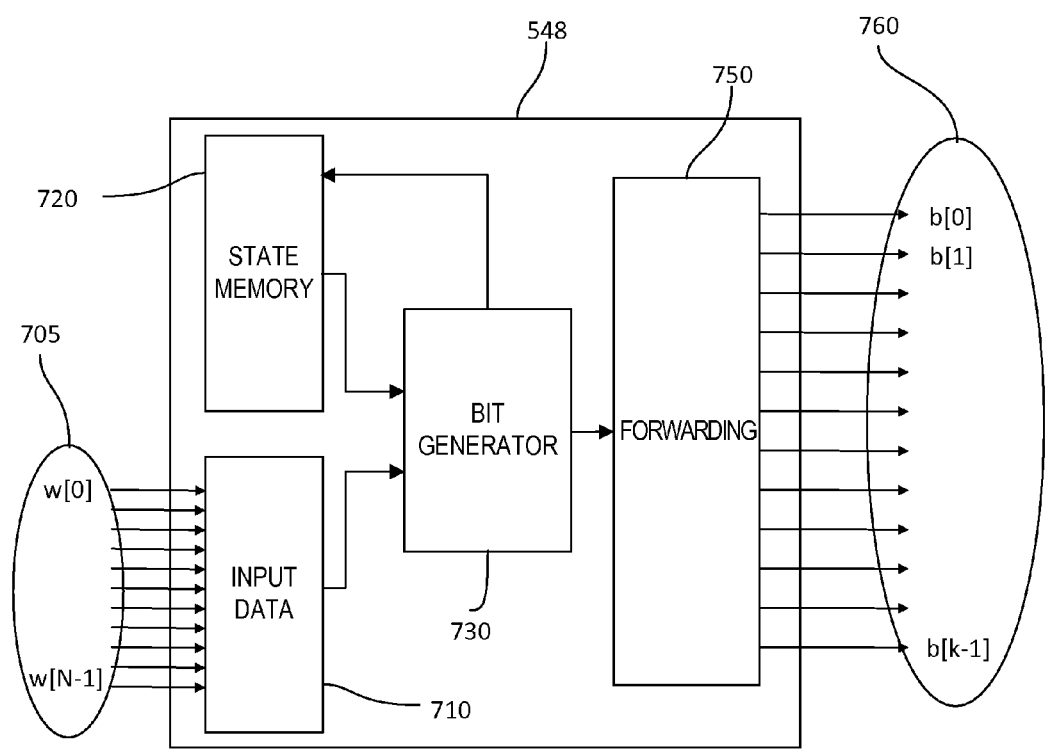
FIG. 7 is an exemplary illustration of a finite state decoder as might be used in the communication system shown in FIG. 5.

FIG. 7 illustrates an example embodiment of finite state decoder 548. Finite state decoder 548 comprises an input data unit 710, a bit generator unit 730, a state memory unit 720, and a forwarding unit 750. In this embodiment, information created by SDC unit 544 (see FIG. 5), denoted by w[0], . . . , w[N−1] and collectively denoted by 705, is forwarded to input data unit 710. Input data unit 710 may perform additional processing on this information, or may just forward it to bit generator unit 730. One task of bit generator unit 730 is to create the output bits b[0], . . . , b[k−1], collectively denoted by 760, and input them to forwarding unit 750, which will send the data to destination 550 (see FIG. 5). These bits may be computed by the bit generator unit 730 based on the input provided by input data unit 710, and the input provided by state memory unit 720. In addition, bit generator unit 730 provides information to be stored by state memory unit 720 for later operations. A task of state memory unit 720 may be to store the temporal correlation between successive codewords received so far. Details of specific operations of state memory unit 720 and how its state is used by bit generator 730 can depend on the particular application; several examples are described below.

It should be understood that these units described above can be implemented as circuit elements, in which case, their power consumption, chip real-estate usage, and the like are considered.

Transition Limited Coding

A first embodiment of finite state encoding and decoding units of FIG. 5 is now described for a particular application. In this application, a goal is to limit the possible transitions on every wire between successive states. As was mentioned above, such limiting may, in applications, lead to an opening of the eye diagram and hence to higher reliability of the received signals. More specifically, where the vector signaling code C used has the property that the coordinates of every codeword belong to a finite set S={$s_1, \ldots, s_t$} of real numbers, and where $s_1 < s_2 < \ldots < s_t$, it may be required that if the state of a wire at some time T is $s_i$, and where there is a measure of distance between the real numbers (such as voltage differences), then the state of the wire at time T+1 may only be $s_j$ wherein i and j are within a certain distance. Where values are used (e.g., real numbers) to represent different selections from the finite set of possible signal values, whether or not they correspond to some physical quantity, those signal values can be ordered and a distance between them provided.

"Transition limited coding" or "TLC" is used herein to refer to vector signaling wherein transitions are constrained as indicated above. Where the certain distance that represents the threshold, i.e., the maximum distance between i and j is at most l, this is referred to as l-TLC encoding.

Figure 8:
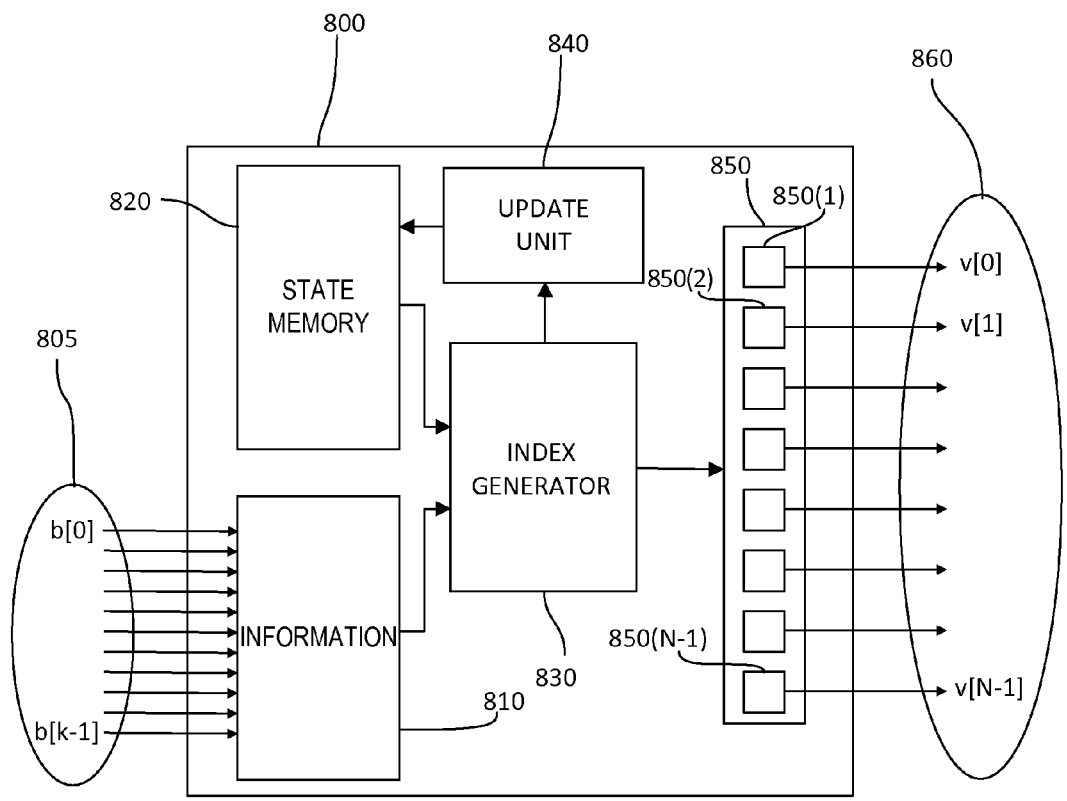
FIG. 8 is an exemplary illustration of a transition limited coding encoder.

FIG. 8 illustrates a finite state encoder 800 that might be used as finite state encoder 524 in communication system 500 shown in FIG. 5. Components of finite state encoder 800 might be almost the same as those of finite state encoder 524 of FIG. 6, such as an input for bits b[0], . . . , b[k−1], collectively denoted as 805, an information unit 810, an index generator 830, a state memory unit 820, and additional memory units 850. Information unit 810 is coupled to input 805, as well as index generator 830, which is in turn coupled to an update unit 840 and additional memory units 850. Additional memory units 850 are coupled to encoder outputs 860 referenced as v[0], . . . , v[N−1]. Finite state encoder unit 800 also comprises an update unit 840, some exemplary operation modes of which will be described below.

Update unit 840 may be an independent unit, or sometimes it may be a part of state memory unit 820. One exemplary task of update unit 840 is to transform the output of index generator 830 to a form suitable for storage by state memory unit 820, as will be seen further below.

The operation of finite state encoder 800 for the case of TLC is now exemplified for a particular non-binary vector signaling code, called the 4b6w code. This code consists of all the 30 permutations of the vector (+1, −1, 0, 0, 0, 0). In other words, this code is the set of all vectors of length 6 in which one entry is +1, one entry is −1, and all other entries are 0. In operation, the number +1 may correspond to some voltage or current level on a wire, and the number −1 may correspond to some other voltage or current level on a wire, as for example taught in SPM. The TLC used is a 1-TLC, which means that transitions between successive states on a wire can only be by a distance of at most 1. The successive states are summarized in Table 1.

TABLE 1

| State at time T | Allowed State at time T + 1 |
|---|---|
| −1 | −1 or 0 |
| 0 | −1, 0, or +1 |
| +1 | 0 or +1 |

Figure 9:
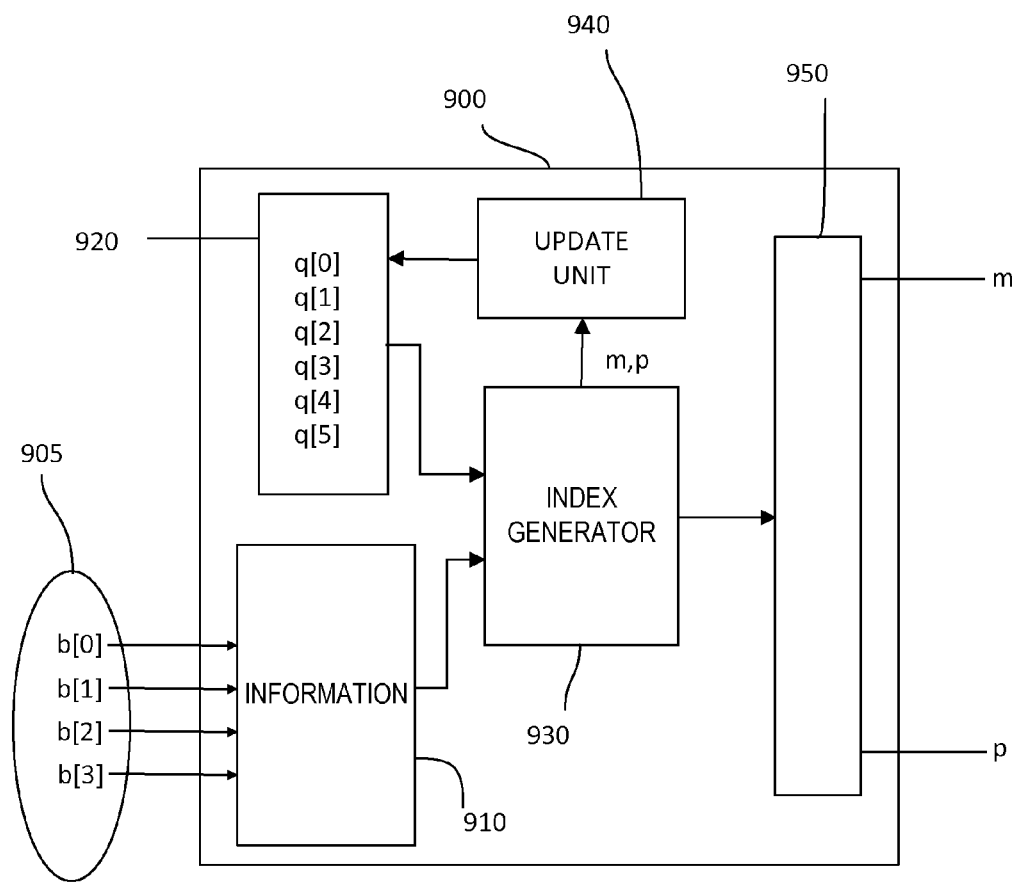
FIG. 9 is an exemplary illustration of one embodiment of a transition limited coding encoder.

FIG. 9 illustrates a finite state encoder 900 that might be used as finite state encoder 524 for 1-TLC. Finite state encoder 900 comprises an input for bits b[0], . . . , b[k−1], collectively denoted as 905, an information unit 910, an index generator 930, a state memory unit 920, and additional memory units 950. Information unit 910 is coupled to input 905, as well as index generator 930, which is in turn coupled to an update unit 940 and additional memory units 950. Additional memory units 950 are coupled to encoder outputs 960 referenced as m and p. Update unit 940 may be an independent unit, or sometimes it may be a part of state memory unit 920. One exemplary task of update unit 940 is to transform the output of index generator 930 to a form suitable for storage by state memory unit 920, as will be seen further below.

Information unit 910 receives bits b[0], . . . , b[k−1] and forwards them to index generator 930. Index generator 930 calculates additional information based on these bits and based on information it receives from state memory unit 920.

The input to information unit 910 is a sequence of four bits b[0], . . . , b[3]. Index generator 930 creates two integers, m and p, both of which are in the set {0, 1, 2, 3, 4, 5}. The index m is the index of the coordinate of the codeword equal to −1, and p is the index of the coordinate of the codeword equal to +1. These indices are output by unit 930. At the same time, these indices enter update unit 940, which does further processing of these indices. State memory unit 920 stores a vector q[0], . . . , q[5] which corresponds to the codeword of the vector signaling code used in the previous time instance. More precisely, q[0] is the index at which the previous codeword was −1, q[5] is the index at which it was +1, and q[1], . . . , q[4] are the indices at which the previous codeword was 0.

At the beginning of the process, that is when there has been no previous vector sent yet, this vector may be set to any values, for example to (0, 1, 2, 3, 4, 5). This exemplary initialization of this vector will be used to explain the concepts. Any other initial vector can be used without changing the operation of this encoder and/or decoder.

Figure 10:
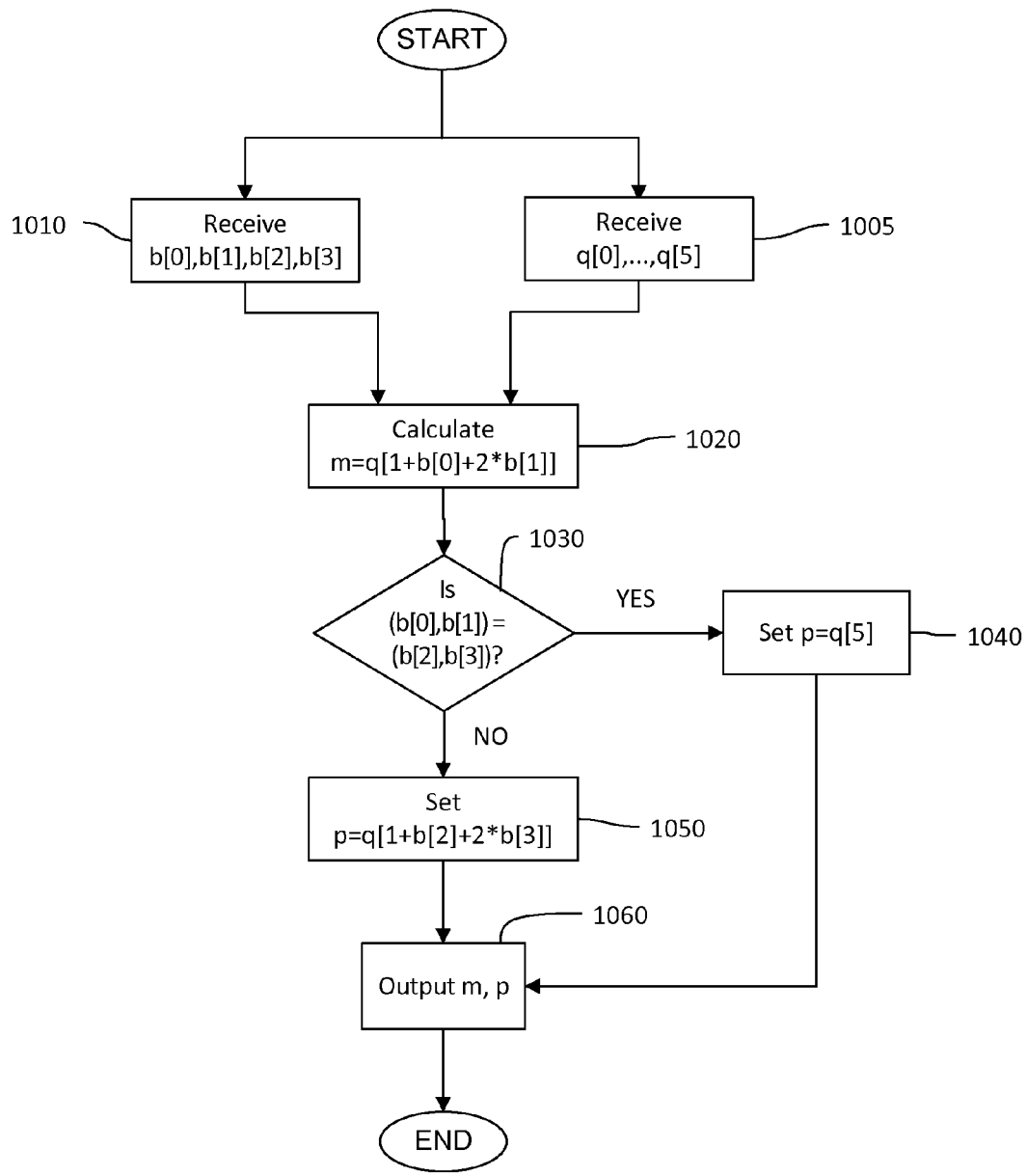
FIG. 10 is a flowchart of a process that might be used by an index generator.

A possible embodiment of a method performed by index generator 930 is now described with reference to FIG. 10. This process might be performed by circuit logic. The inputs to this process are the bits b[0], . . . , b[3], obtained from information unit 910 and the previous state q[0], . . . , q[5] of the wires obtained from state memory unit 920. In step 1020, the value of the index m is set to be q[1+b[0]+2*b[1]]. This means that the wire carrying the value −1 changes its state in the next time instance. Next, in step 1030 it is checked whether b[0]=b[2] and simultaneously b[1]=b[3]. If so, then the index p is calculated in step 1040 to be equal to q[5], meaning that the wire in the state +1 stays in that state for the next time instance. If the test in step 1030 is negative, then the index p is calculated in step 1050 to be equal to q[1+b[2]+2*b[3]], which means that there will be a transition from +1 to 0 in the next time instance. Finally, in step 1060 the indices m and p are output.

Figure 11:
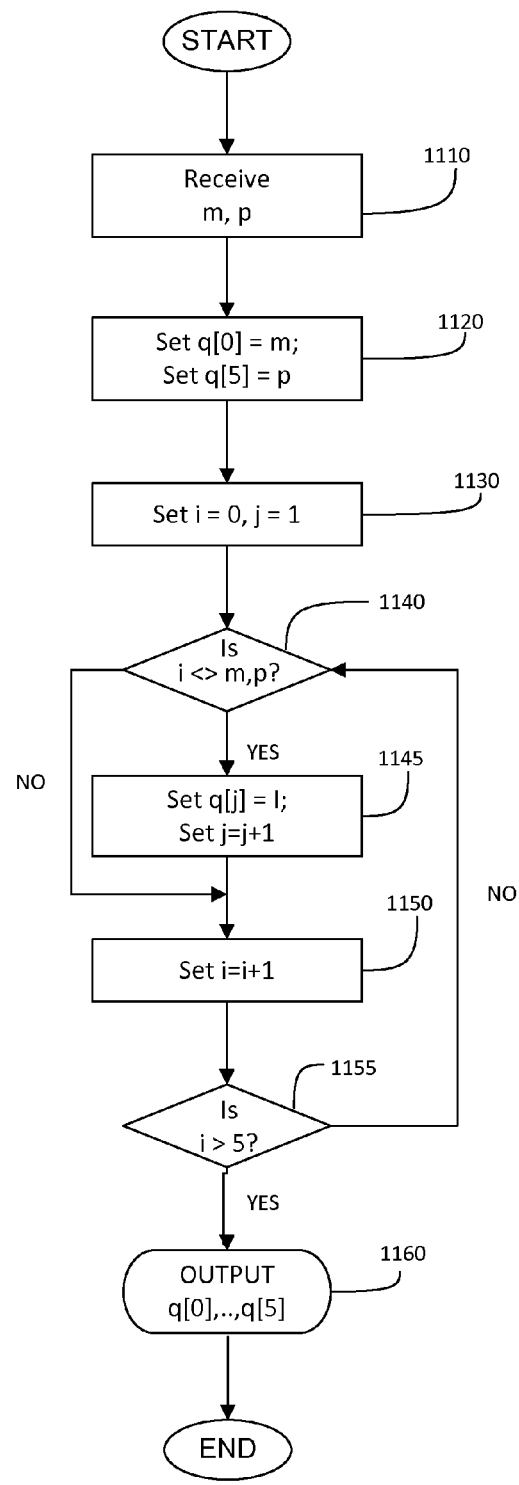
FIG. 11 is a flowchart of a process that might be used by an update unit.

An exemplary operation of update unit 940 of FIG. 9 is shown in the process of FIG. 11. The inputs to this process are the indices m and p computed by index generator 930. A task of update unit 940 is to re-compute the vector q[0], . . . , q[5] according to the new codeword calculated. To this end, in step 1120, q[0] is set to m, and q[5] is set top. The subsequent steps of this procedure have the effect of setting q[1], . . . , q[4] to the indices of those positions in the codeword that are equal to 0.

An example of the state values q[0], . . . , q[5], the input bit values b[0], . . . , b[3], and the values sent on the 6 communication wires is given in the tables of FIG. 12. Initially, the state vector is set to (0, 1, 2, 3, 4, 5). Upon reception of the bit sequence (0, 0, 1, 0), an index generator operating according to the process of FIG. 10 calculates the values of m and p. In this case, m=q[1]=1, and p=q[2]=2, leading to values 0, −1, 1, 0, 0, 0 on the respective wires. An update unit operating using the process of FIG. 11 then computes the new state vector as (1, 0, 3, 4, 5, 2) which shows that wire 1 had a value of −1 in that time instance, wire 2 had a value of +1, and all the other wires had a value of 0. In the next time instance, upon receiving the bit sequence (1, 1, 0, 1), the value of m is calculated by the index generator to be q[1+1+2]=q[4]=5, whereas the value of p is calculated to be q[1+2]=q[3]=4. The update unit computes the new state vector as (5, 0, 1, 2, 3, 4), which shows that wire 5 had a value of −1, and wire 4 had a value of +1. In the next time instance, the input bits may be (0, 1, 0, 1). The index generator then calculates the value of m to be q[1+0+2]=q[3]=2. Since in this case b[0]=b[2]=0, and b[1]=b[3]=1, the test in step 1030 of FIG. 10 is affirmative, and p is set to q[5]=4. The new state vector is then (2, 0, 1, 3, 5, 4). In the next time instance, the bit sequence (0, 0, 0, 0) may be received, upon which the value of m may be calculated according to step 1020 of FIG. 10 to be q[1]=0. Since the test in step 1030 of FIG. 10 is affirmative, the value of p is set to be q[5]=4, and the new state vector is (0, 1, 2, 3, 5).

Note that in this procedure, the wire that carries a value of −1 always makes a transition. This may be used in certain applications in conjunction with other methods to facilitate tasks such as clock data recovery.

As explained above, power consumption can be a concern. This 1-TLC encoder is particular efficient in that regard. The vertical opening of the eye diagram depends on the amount of voltage corresponding to +1 and −1 in this scheme. In order to have the same swing, i.e., difference in voltage levels of neighboring states, the difference of voltage levels between +1 and −1 may need to be double the swing of a DS link, which leads to doubling the power consumption. Using 1-TLC as described here, the power consumption of the link is equal to that of 2 DS links, whereas its throughput is twice that of 2 DS links. So, at the same clock rate, this link would use half the power of an equivalent (in terms of throughput) DS link, would use 66% of the wires (6 wires instead of 8), and would lead to eye diagrams with the same horizontal and vertical openings.

Figure 13:
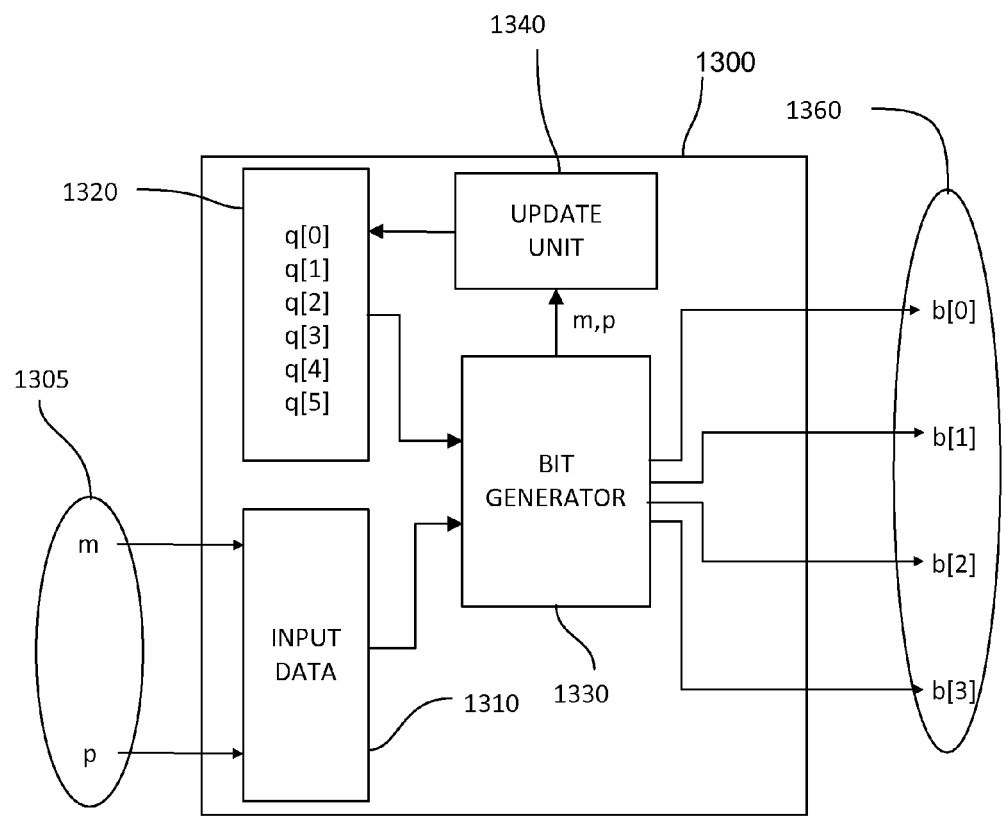
FIG. 13 is an exemplary illustration of one embodiment of a transition limited coding decoder.

FIG. 13 illustrates a finite state decoder 1300 that might be used as finite state decoder 548 for 1-TLC.

Finite state decoder 1300 comprises an input data unit 1310, a bit generator unit 1330, a state memory unit 1320, and an update unit 1340 (separate or as part of state memory unit 1320). Inputs to finite state decoder 1300 include two indices m and p, collectively denoted by 1305, and the output are four bits b[0], . . . , b[3], collectively denoted by 1360. Bit generator 1330 forwards the received indices m and p to update unit 1340, while concurrently calculating the bits from this input, and the input provided by state memory 1320.

In this embodiment, state memory unit 1320 keeps a vector q[0], . . . , q[5] in its memory. This vector, whose operation is detailed below, may be updated at every time instance. Note, however, that it is not necessary to keep the entire vector in memory; this can be modified to work with substantially less memory, for example only the two indices m and p of the previous instance.

Figure 14:
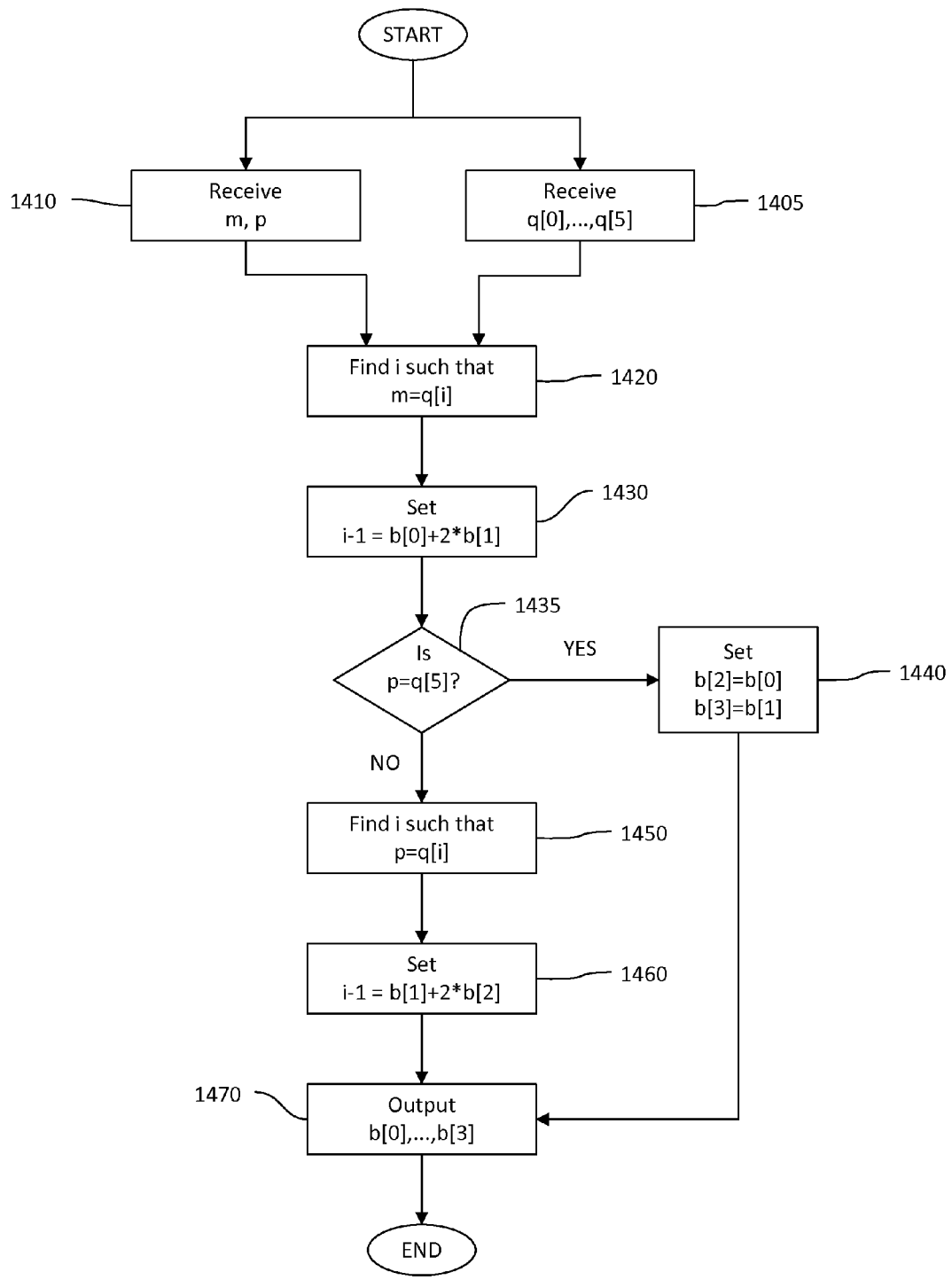
FIG. 14 is a flowchart of a process that might be used by the bit generator in embodiments of a transition limited coding decoder.

An exemplary operation of bit generation unit 1330 is exemplified in FIG. 14. The inputs to this process are the indices m and p, forwarded to bit generation unit 1330 by input data unit 1310 of FIG. 13, and the vector q[0], . . . , q[5] from state memory unit 1320. In step 1420, an index i is found such that q[i] equals m. This can be accomplished in many different ways. Because of the way the 1-TLC codewords are encoded, this index will always be in the set {1, 2, 3, 4}. Once it is found, the binary expansion of i−1 is obtained in step 1430. This reveals the first bits b[0] and b[1]. If p=q[5], a test performed in step 1435 on whether p is equal to q[5]. If so, then the wire with value +1 did not change its position, and hence it is deduced that b[2]=b[0], and b[3]=b[1] in step 1440. If the test in step 1435 is negative, then the value i is found where q[i]=p, and the binary expansion of i−1 leads to the bits b[2] and b[3] in step 1460.

A different embodiment of a TLC encoder and decoder is now described with reference to FIGS. 15-19. In this embodiment, ten wires are used to transmit eight bits. The pin-efficiency of this method is therefore equal to 80%, which is better than the pin-efficiency of the previous method, which was 66%. Moreover, as at any time instance two wires carry a value of +1 and two carry a value of −1, the driver power consumption of this scheme is 50% of that of the power consumption of eight DS links capable of transmitting eight bits in one clock cycle.

The non-binary vector signaling code used in this embodiment is the code called the 10b10w code consisting of all 1260 permutations of the vector (+1, +1, −1, −1, 0, 0, 0, 0, 0, 0) having 10 coordinates of which two are +1, two are −1, and the rest are 0. Note that since this is a permutation code, it is a constant-weight code and it is also a constant-sum code. Since the components have values from a set of at least three values, the sum can be zero while still allowing for a logical zero coordinate value.

Figure 15:
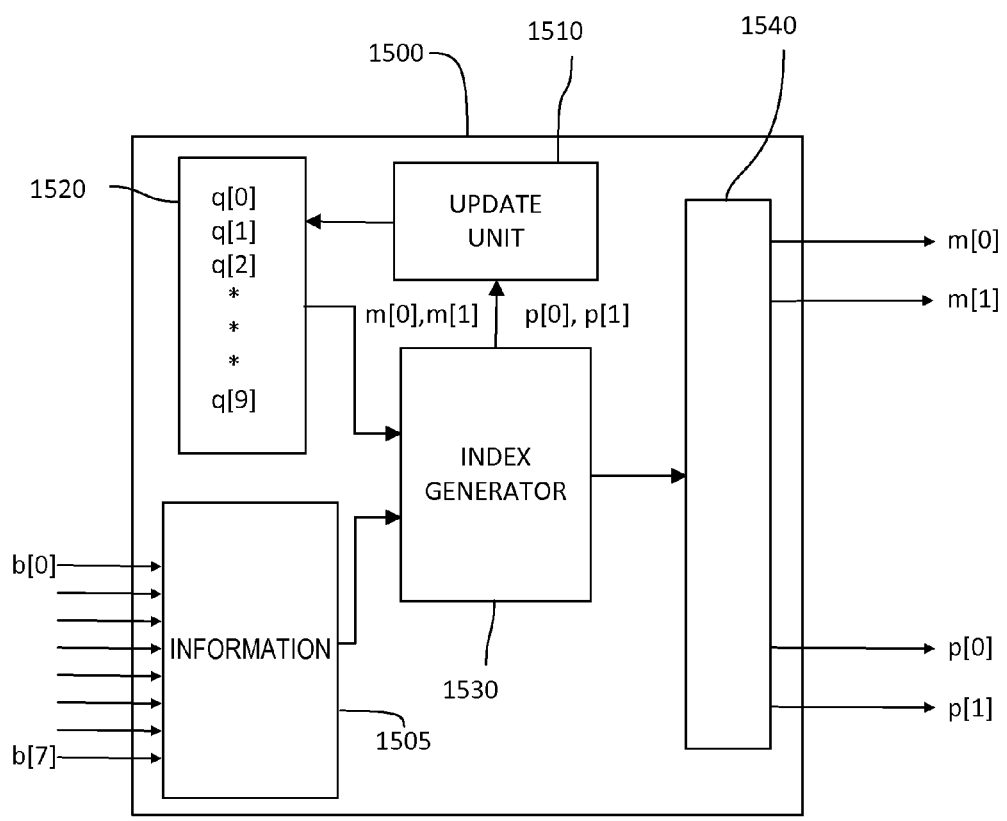
FIG. 15 an exemplary illustration of another embodiment of a transition limited coding encoder.

FIG. 15 is an exemplary embodiment of a finite state encoder 1500 as might be used as finite state encoder 524 of communications system 500 shown in FIG. 5. The functional components of finite state encoder 1500 are similar to those of finite state encoder 900 in FIG. 9, i.e., an input for bits b[0], ..., b[k−1], an information unit 1505, an index generator 1530, a state memory unit 1520, and output unit 1540. Information unit 1505 is coupled to the inputs, as well as index generator 1530, which is in turn coupled to an update unit 1510 and output unit 1540. Update unit 1510 may be an independent unit, or sometimes it may be a part of state memory unit 1520. One exemplary task of update unit 1510 is to transform the output of index generator 1530 to a form suitable for storage by state memory unit 1520.

Some differences are, however, that state memory unit 1520 may store 10 values q[0], ..., q[9], output unit 1540 may output four values m[0], m[1], p[0], p[1], and index generator 1530 may forward these four values to update unit 1510. In operation, m[0], m[1], p[0], p[1] may correspond to information which enables the driver to transmit a unique codeword of the vector signaling code used for transmission.

Figure 16:
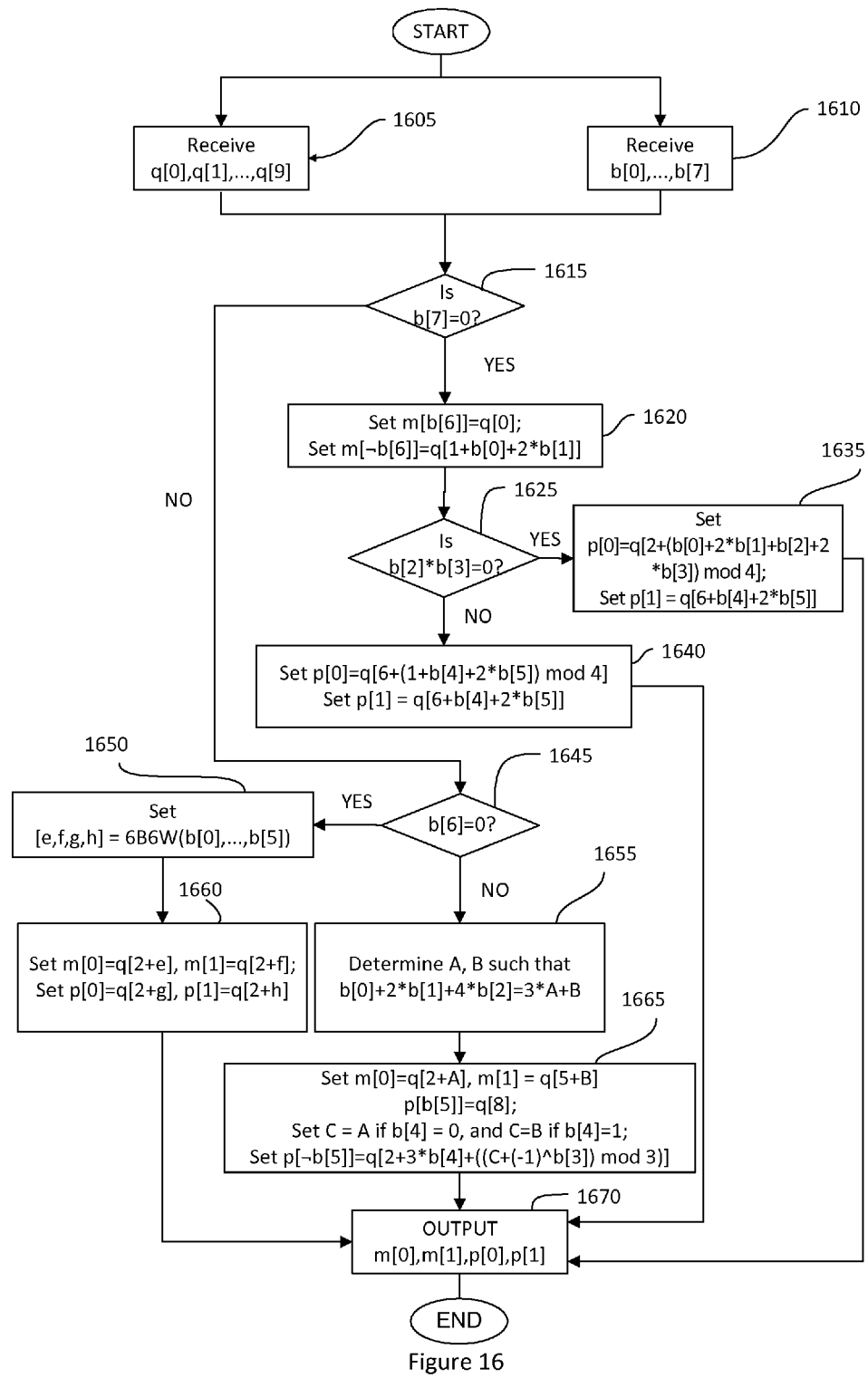
FIG. 16 is a flowchart of a process that might be used by an index generator of a transition limited coding decoder.

FIG. 16 shows an exemplary flowchart of one embodiment of a process performed by index generator 1530 of FIG. 15. The input to this process are the bits b[0], ... b[7] to be transmitted (which may have been forwarded by information unit 1505 of FIG. 15), as well as the current state q[0], ..., q[9] of state memory 1520 of FIG. 15. In step 1615, it is tested whether b[7] equals zero. If the result of this test is positive, then m[b[6]] is set to q[0], and m[¬ b[6]] is set to q[1+b[0]+2b[1]], wherein ¬ x denotes the negation of the Boolean variable x, i.e., ¬ 0=1 and ¬ 1=0. In step 1625, it is tested whether at least one of b[2] and b[3] is zero. If so, then the values of p[0] and p[1] are calculated as given in step 1635, and then the process is terminated. If the result of the test in step 1625 is negative, then the values of p[0] and p[1] are calculated as given in step 1640, and then the process is terminated.

If the result of the test in step 1615 is negative, then the process continues with Step 1645 where it is tested whether b[6] is zero. If so, then in step 1650 an auxiliary process called 6B6W is used the operation of which will be detailed further below. This process is applied to the bits b[0], ..., b[5] to obtain four indices e, f, g, h, all integers in the set {0, 1, ..., 5}. These integers are used in step 1660 to calculate the values of m[0], m[1], p[0], p[1] and the process is terminated.

If the result of the test in step 1645 is negative, then the quotient A and the remainder B of the integer b[0]+2b[1]+4b[2] are calculated in step 1655. These integers are between 0 and 2, and can be calculated using Boolean formulas. They are used in step 1665 to calculate the values of m[0], m[1], p[0], p[1] and the process is terminated. Note that the mod-operation in step 1665 is meant to return the unique remainder of the quantity $C+(-1)^{b[3]}$ after division by 3 wherein the remainder is in the set {0, 1, 2}.

A flowchart of an exemplary embodiment of the process for calculating the function 6B6W is now described with reference to FIG. 17. The input to this process are 6 bits b[0], ..., b[5]. The output is a vector of 4 indices r[0], ..., r[3] in the range {0, ..., 5}. In step 1710, the quotient A and the remainder B of the integer b[0]+2b[1]+4b[2] are calculated, and in step 1715, a test is performed as to whether or not b[5] is equal to 1. If so, then the output bits are calculated in step 1720 and the process is terminated. If the result of the test in step 1715 is negative, then two of the output bits are calculated in step 1725. For the two others, a test is performed in step 1730 whether b[4] is zero. If so, then the two other output bits are calculated in step 1735 and the process is terminated. If the test in step 1730 is negative, i.e., if b[4]=1, then the two remaining output bits are calculated in step 1740 and the process is terminated.

Figure 17:
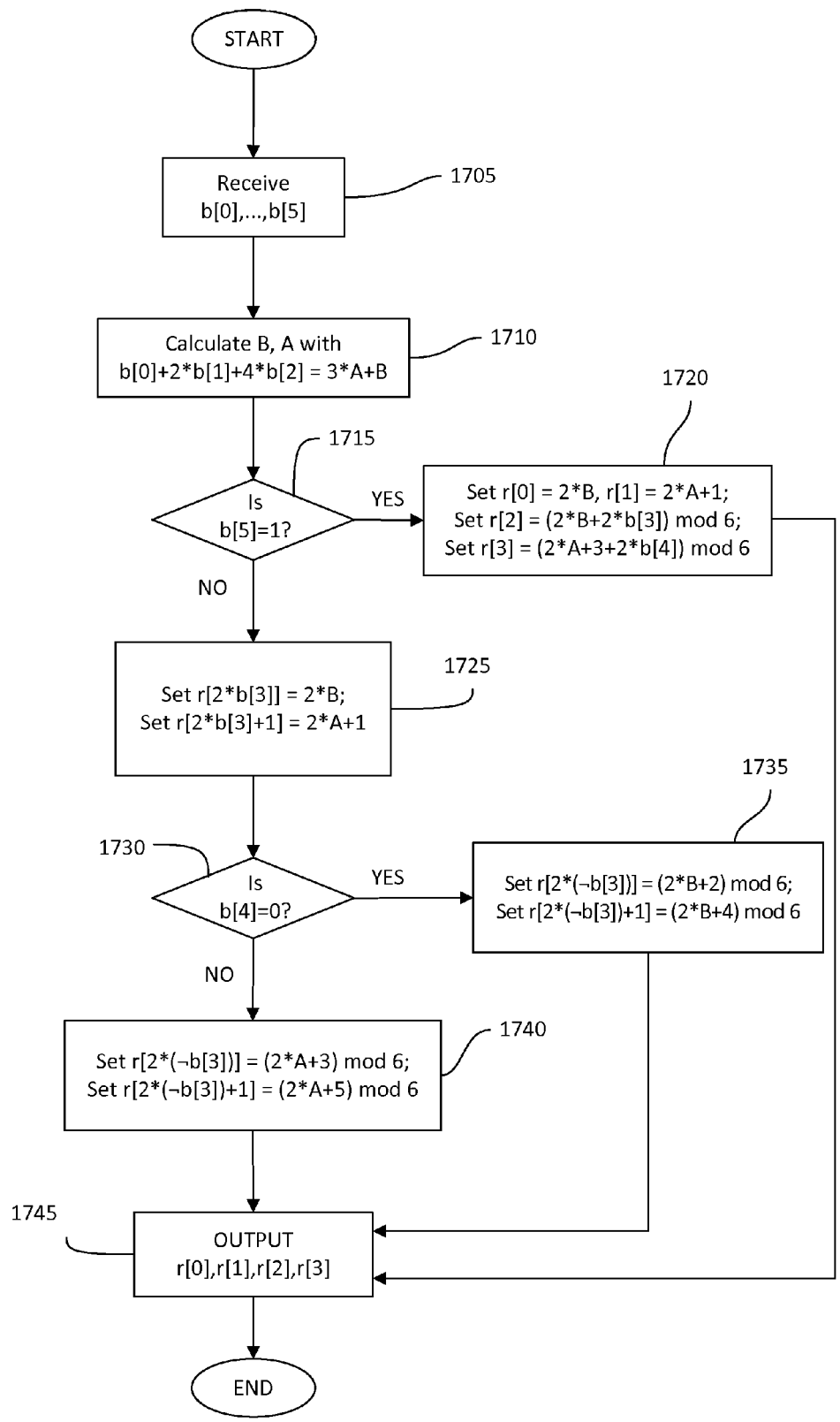
FIG. 17 is a flowchart of another process that might be used by an index generator of a transition limited coding decoder.

Exemplary implementations of the processes in FIG. 16 and in FIG. 17 are given in Appendix I and Appendix II, respectively, written in the C language.

Figure 18:
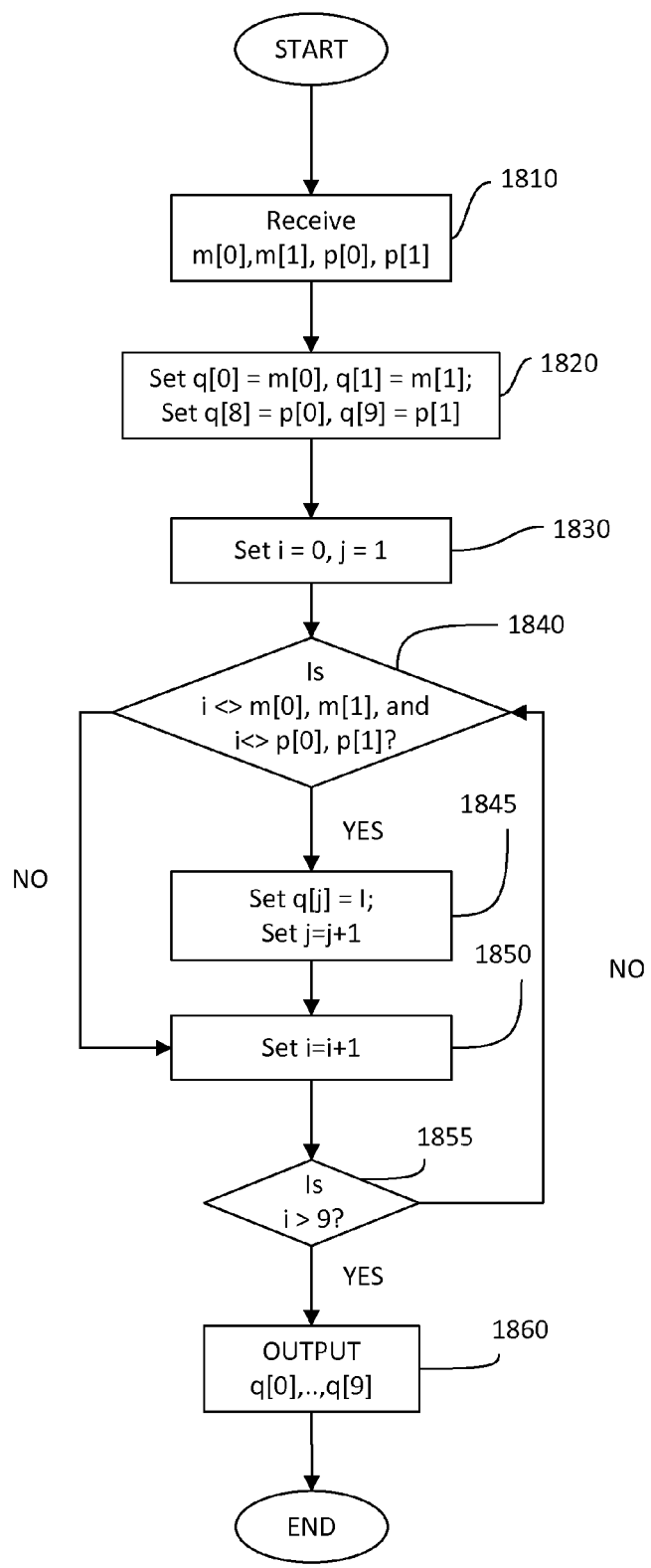
FIG. 18 is a flowchart of a process that might be used by an update unit of a transition limited coding decoder.

An exemplary embodiment of a process performed by update unit 1510 is shown in FIG. 18. The operation of this update unit is similar to the one described in FIG. 11. A task of this unit is to update the vector q[0], ..., q[9] according to the information m[0], m[1], p[0], p[1]. As can be seen from the flowchart, the values q[0], q[1], q[8], q[9] are updated according to step 1820. The remaining values q[2], ..., q[7] are the indices of the wires carrying a zero, sorted in ascending order. This type of sorting is not necessary for the operation of this unit, and has been chosen for ease of presentation only.

An example of TLC encoding according to the processes described above is given in FIG. 19. For example, where the vector stored in state memory unit is (2, 8, 0, 1, 3, 4, 5, 9, 6, 7), and where the input bits are (1, 1, 0, 1, 0, 1, 0, 1), the values m[0]=0, m[1]=4, p[0]=3, p[1]=9 are obtained, the codeword of the vector signaling code used is calculated as (−1, 0, 0, 1, −1, 0, 0, 0, 0, 1), and the state of state memory unit is updated to (0, 4, 1, 2, 5, 6, 7, 8, 3, 9). If in the next step the bit vector to be transmitted is (1, 0, 1, 0, 1, 0, 1, 0), then the values m[0]=1, m[1]=0, p[0]=5, p[1]=8 are obtained, the codeword of the vector signaling code used is calculated as (−1, −1, 0, 0, 0, 1, 0, 0, 1, 0), and the state of state memory unit is updated to (1, 0, 2, 3, 4, 6, 7, 9, 5, 8).

Similar to the process in FIG. 14, a finite state decoding process can be designed for the case of this TLC as well. Various methods can be used to achieve this. One example is the use of a table-lookup. Another method is the design of a process that is the inverse of the encoding process of FIG. 15. The decision on which one of these methods should be used in a particular application depends on the resources available.

Examples of eye diagrams when TLC coding is used are given with reference to FIGS. 22-25. In this case, the clock speed on every wire is 8 Gigahertz. On FIG. 22, the eye diagram on one of the wires is shown when the channel experiences a lot of intersymbol interference and the 10b10w code is used without limiting any transitions. In this case, the horizontal eye opening is less than 80 picoseconds.

Figure 23:
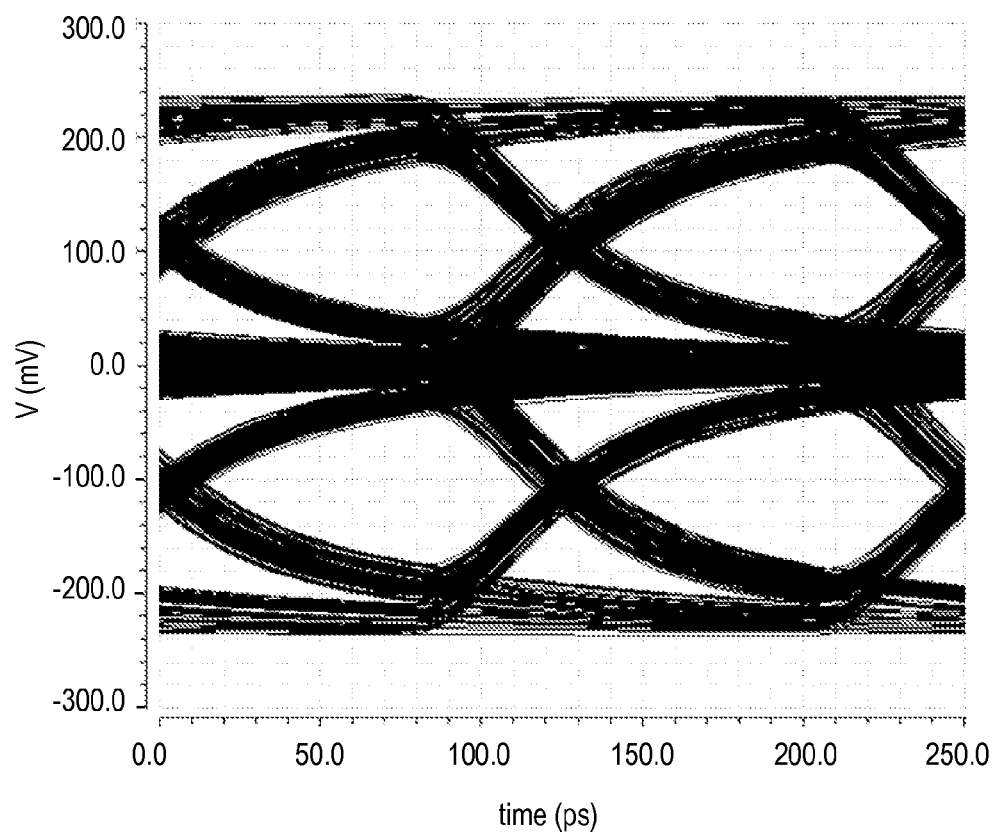
FIG. 23 is an eye diagram on one wire using the same vector signaling code as in FIG. 22, but limiting the transition amounts on every wire using the teachings of this application.

FIG. 23 shows the eye diagram for the same channel when the TLC encoder of FIG. 15 is used. The eye diagram is much cleaner, and in particular the horizontal eye opening has improved to more than 100 picoseconds, leading to more than 25 picoseconds improvement of the horizontal eye opening. To obtain a similar eye opening without TLC coding, a lot of equalization would have been needed, leading to a higher energy consumption of the link.

Since the process of TLC coding can be implemented efficiently with digital or mixed signal logic, the TLC code thus greatly improves the quality of the signals with almost no additional overhead of the energy consumption.

Figure 24:
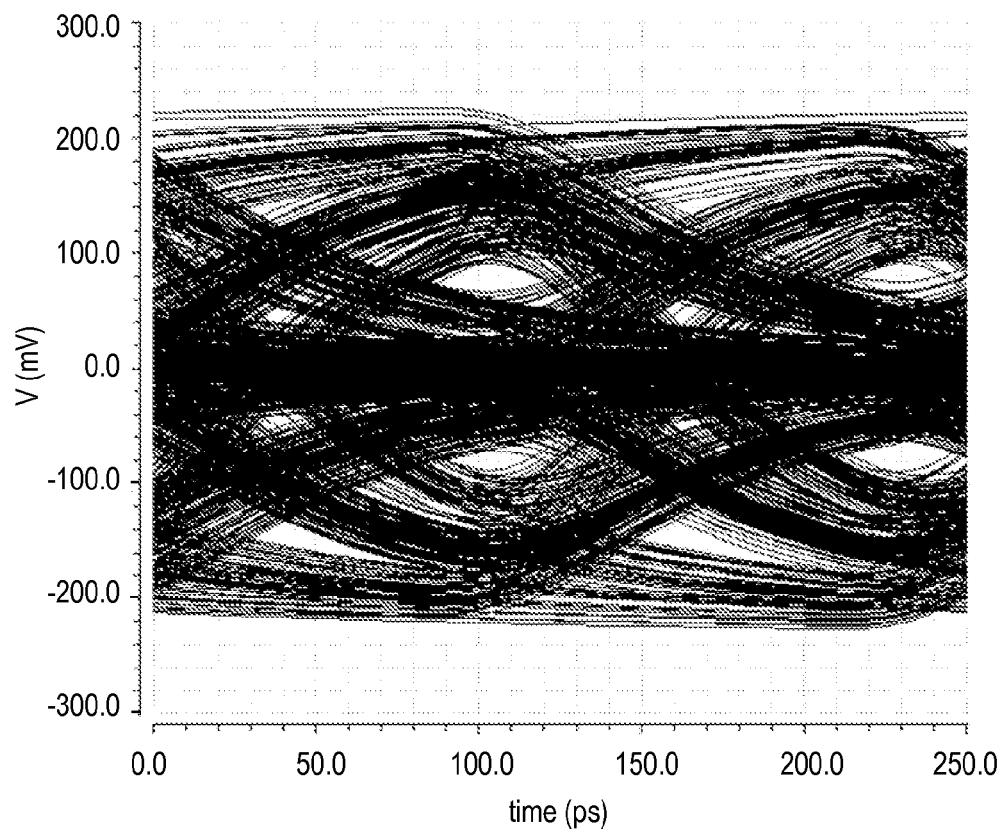
FIG. 24 is another eye diagram on one wire using a particular vector signaling code on a particular channel without limiting the amount of transitions.

Another example is given in FIG. 24, where the 10b10w is used without any limits on transitions on a channel that induces a lot more intersymbol interference, and possibly crosstalk, and as can be seen in the figure, the eyes are almost closed; the signal is hence unusable, and only a fair amount of equalization would be able to open the eyes to an extent that is usable in practice.

Figure 25:
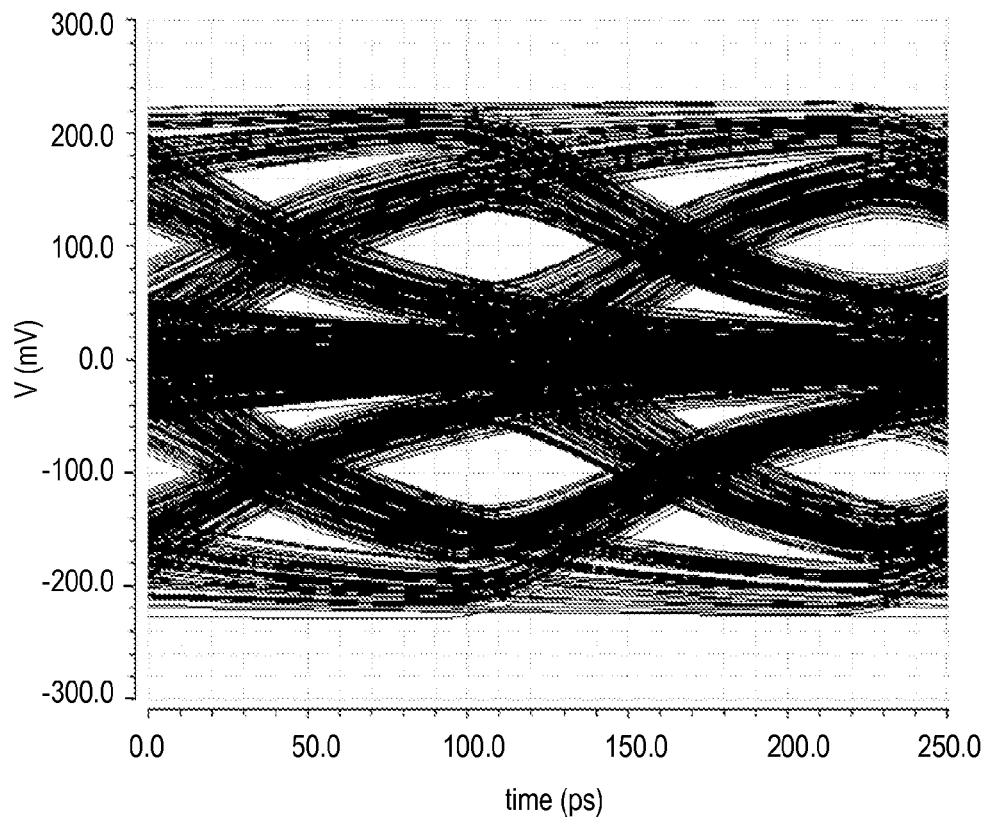
FIG. 25 is an eye diagram on one wire using the same vector signaling code as in FIG. 24, but limiting the transition amounts on every wire using the teachings of this application.

FIG. 25 shows the eye diagrams under the same channel conditions when the TLC encoder of FIG. 15 is used. As can be seen, the eyes are meaningfully open at around 70 picoseconds without the need of further equalization.

Enforcing Transitions

In some applications, it is advantageous to have transitions on every wire, at least every once in a while. This has the effect of spectrally shaping the transmitted signal such that less energy may be present around 0 Hz. An application of this is that the link may be AC coupled and thereby allowing for different common-mode levels at the transmitter and receiver. Furthermore, such transitions allow alleviation of the load on the electronic components necessary for driving the communication wires, or for receiving and estimating the signals on these wires. In other applications, such transitions may be used to perform a clock data recovery ("CDR") and therefore not spending resources for an explicit synchronized clock between the sender and the receiver.

Finite state encoding and decoding allows for enforcing such transitions. Various examples of such Transition Enforcing Coding ("TEC") techniques are described below.

In a first example, a vector signaling code C is used in which the codewords consist of all the 30 permutations of (+1, −1, 0, 0, 0, 0), thus forming a CSNBV signaling code. The particular TEC described below enforces a transition of non-zero wires at every clock cycle. This means that a wire carrying the value +1 at some time instance is forced to carry one of the values 0 or −1 in the next time instance. Similarly, a wire carrying the value −1 at some time instance is forced to carry one of the values 0 or +1 in the next time instance. Note that such a TEC would not be able to transmit any information if a binary vector signaling code is used, since the codeword in a given clock cycle would be completely determined by the codeword in the previous clock cycle.

The encoding and decoding process for the TEC code when the vector signaling code C above is used is very similar to the encoding and decoding process for the TLC code for C. In addition to the state $q[0], \ldots, q[5]$, state memory unit 920 shown in FIG. 9 would keep another bit x, which changes at every time instance, and which can be initialized to an arbitrary value (for example 0) at the beginning. The interpretation of the indices m and p generated by finite state encoder 900 of FIG. 9 then depends on x. Where x is zero, m may correspond to the index of the wire carrying a −1 and p may correspond to the index of a wire carrying a +1. Where x is 1, a +1 may be transmitted on the wire with index m and a −1 may be transmitted on a wire with index p. The operation of this TEC encoder is now exemplified in the table shown in FIG. 26.

A similar approach can be used with the encoder in FIG. 15.

In some applications, it may not be necessary to have a transition on +1 and −1 wires in every time instance. Rather, one might require at least one transition every t-th time instance, wherein t is an integer that may depend on the particular application, and/or on the particular electronic components used.

An embodiment of such a finite state encoder 2000 is now described with reference to FIG. 20. The input to this unit may be a stream of bits $b[0], b[1], \ldots$, or it may be a block of bits to be processed by the encoder. The example of the input as a stream of bits is not meant to be limiting.

In this particular embodiment, it is assumed that communication bus 500 of FIG. 5 uses 8 wires to transmit the information. Moreover, it is assumed that the vector signaling code used is the 8b8w code as disclosed in SPM. This code comprises the 420 distinct permutations of the vector (+1, +1, −1, −1, 0, 0, 0, 0), so it is a CSNBV signaling code with non-unique components. As disclosed in SPM, an encoder for this code may produce, upon being input by an 8-bit vector, two indices $m[0], m[1]$ and two indices $p[0], p[1]$, both in the set $\{0, 1, 2, 3, 4, 5, 6, 7\}$, and all distinct. The functional interpretation of these indices, as used by an embodiment of driver unit 528 of FIG. 5 may be that the wires with indices $m[0], m[1]$ carry a value of −1, whereas the wires with indices $p[0], p[1]$ carry a value of +1, whereas all the other wires carry a value of 0.

Figure 20:
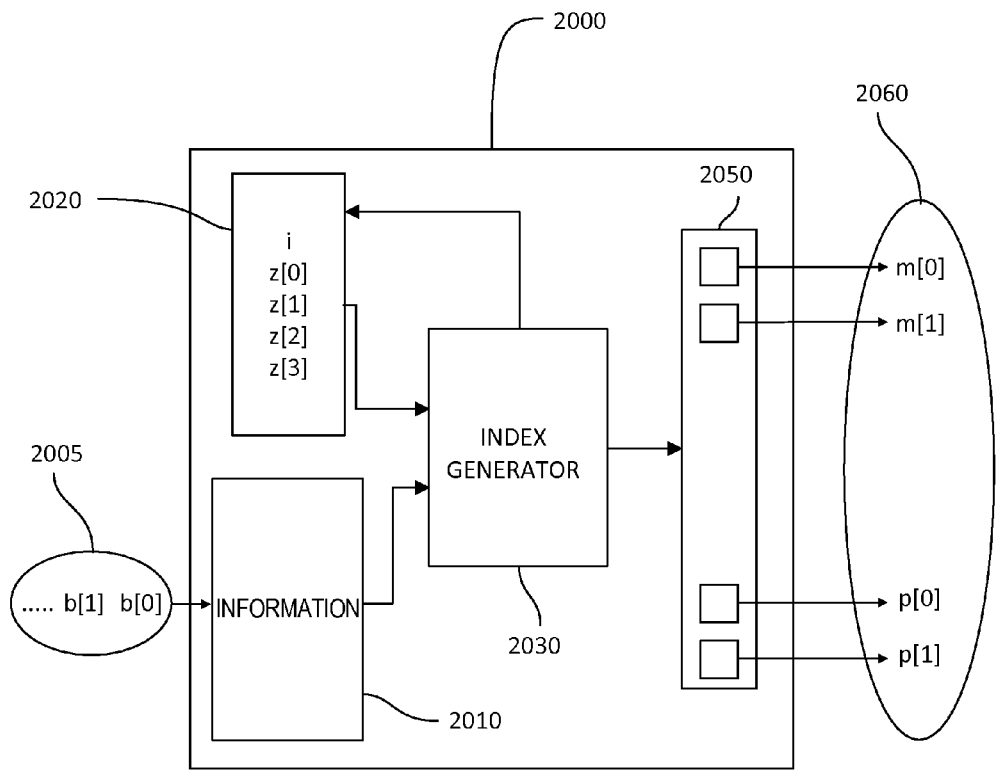
FIG. 20 is an exemplary illustration of another embodiment of an encoder for a transition enforcing coding scheme.

The functional components of finite state encoder 2000 given in FIG. 20 are similar to those of a general finite state encoder given in FIG. 6. The encoder comprises an information unit 2010, an index generator 2030, a state memory unit 2020, and a forwarding unit 2050. The input to finite state encoder 2000 is a stream of bits $b[0], b[1], \ldots$, collectively denoted by 2005. The output, at every time instance, are four indices $m[0], m[1], p[0], p[1]$, collectively denoted by 2060, which may determine that the wires with indices $m[0], m[1]$ carry a −1 at this time instance, whereas the wires with indices $p[0], p[1]$ carry a +1, and all the other wires carry a 0. The exact interpretation of these indices depends on the underlying application. These indices uniquely determine a codeword of the vector signaling code for transmission.

In this example, state memory unit 2020 stores five values some of which may be updated every time instance, whereas some others may be updated every t-th time instance, wherein t is a positive integer determined by the application, and/or by the expectations set to the finite state decoder. In operation, t may determine the number of time instances in which there must have been at least one transition on every wire of communication bus 500 of FIG. 5.

At every time instance, index generator 2030 may forward the calculated indices $m[0], m[1], p[0], p[1]$ for updating the state information in state memory unit 2020. In applications, the state value i of state memory unit 2020 may correspond to the number of time instances since a last "transition event" wherein a transition event may be defined as the event in which a forced transition on all the wires took place. The states $z[0], \ldots, z[3]$ may correspond to the indices of those wires which carried a 0 in the previous time instance, or in the time instance just before a transition event.

Figure 21:
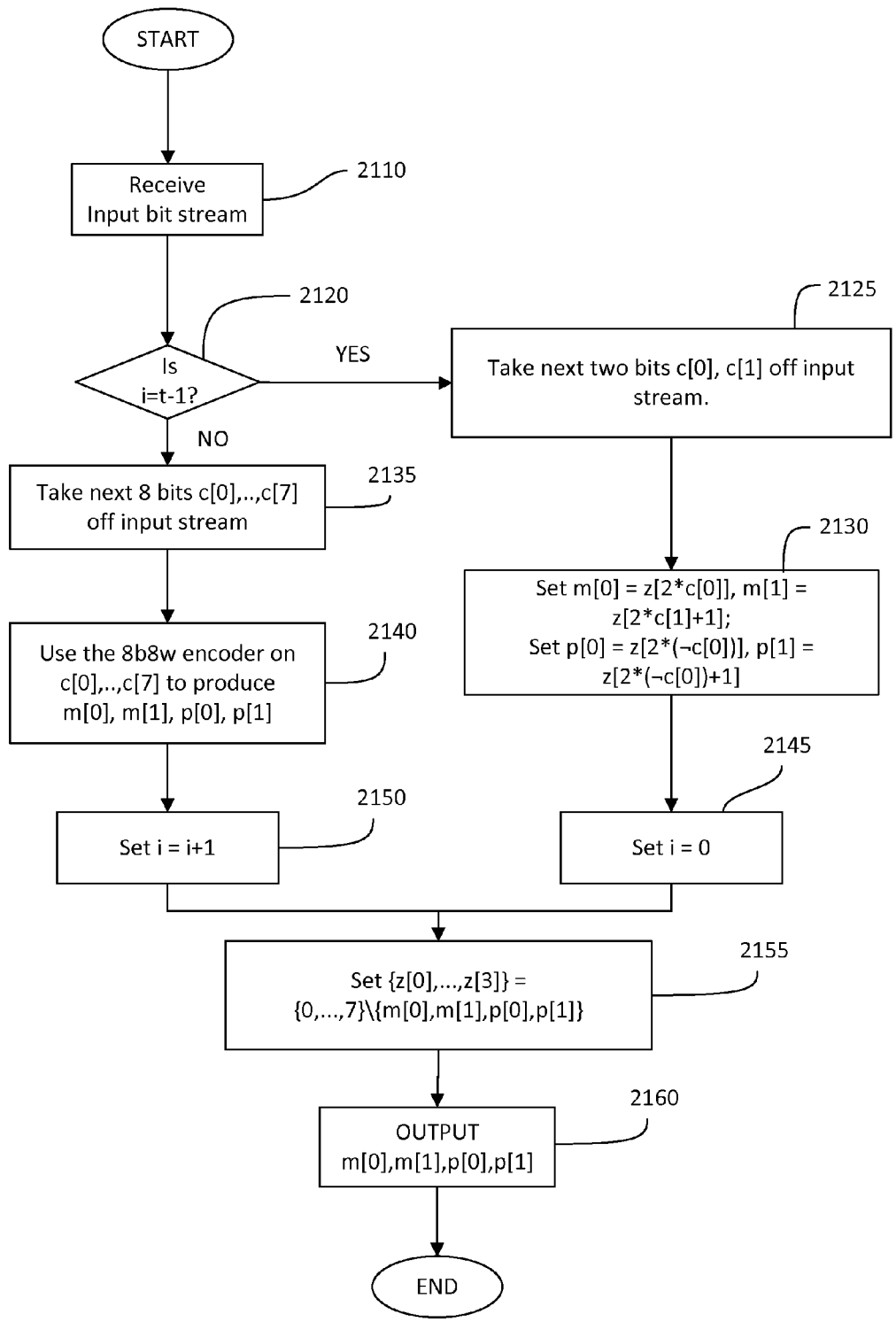
FIG. 21 shows an exemplary embodiment of an index generator unit for a transition enforcing coding scheme.
Figure 22:
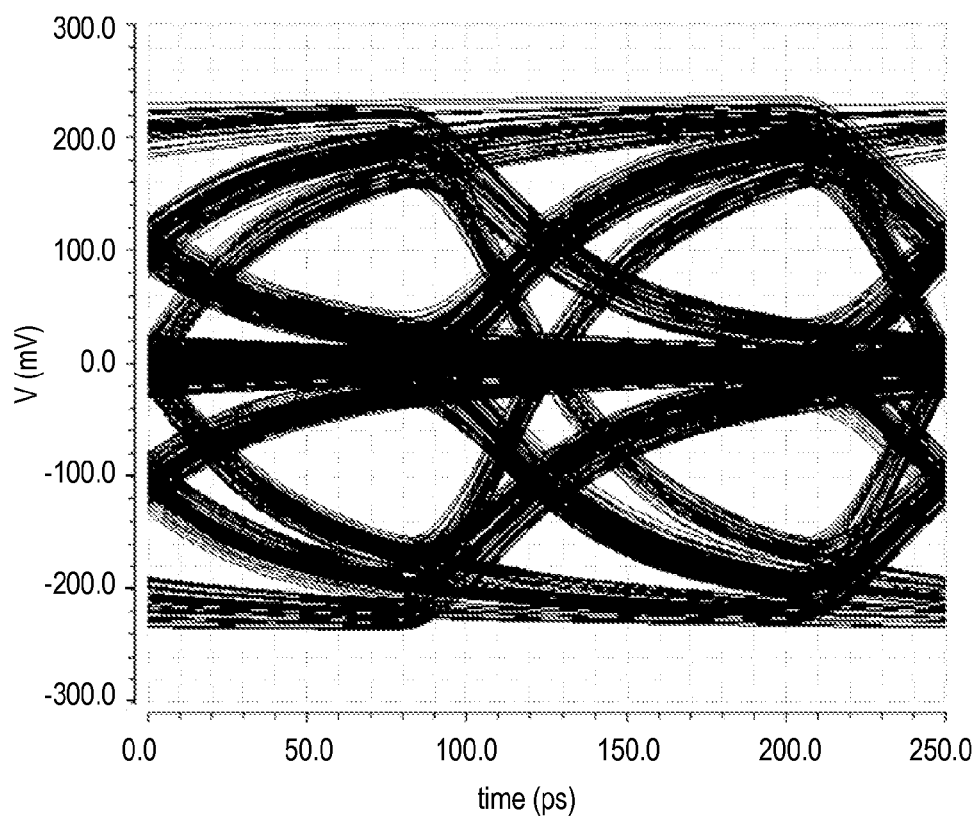
FIG. 22 is an eye diagram on one wire using a particular vector signaling code on a particular channel without limiting the amount of transitions.

A flowchart describing an embodiment of a possible operation of index generator 2030 of FIG. 20 is now described with reference to FIG. 21. The input to this process is a bit stream in step 2110. This bit stream may have been provided through information unit 2010 of FIG. 20. In step 2120, one of the variables of state memory 2020 of FIG. 20, namely, the variable i, is checked to be t−1 or not. If it is, then a transition event is triggered and steps 2125, 2130, and 2145 are performed. Specifically, in step 2125, the next two bits off the input stream are taken and denoted by $c[0], c[1]$. These bits are used to calculate the values of $m[0], m[1], p[0], p[1]$ as in step 2130. The state variable i is set to 0 in step 2145.

If the result of the test in step 2120 is negative, i.e., if i is not t−1, then in step 2135, the next 8 bits c[0], ..., c[7] are taken off the input stream. Next, in step 2140, the 8b8w encoder disclosed in SPM is applied to this bit stream in order to obtain the values of m[0], m[1], p[0], p[1], and the state variable i is increased by 1 in step 2150. The other state variables, z[0], ..., z[3] are updated in step 2155 to be equal to those indices in {0, 1, 2, ..., 7} which are not equal to any of the indices m[0], m[1], p[0], p[1].

As can be seen from the above description, this TEC encoder is capable of sending 8t−6 bits in t time instances. Its "temporal pin-efficiency" may thus be regarded as (8t−6)/8t, wherein here the temporal pin-efficiency may be defined the ratio of the number of bits sent over a particular time interval, by the number of wires used over that time interval.

Other Finite State Encoders and Decoders

Many other TLC and TEC coding techniques can be used when combining vector signaling codes such as vector signaling codes with non-unique components, with a finite state memory, as explained herein. Some more examples will now be introduced and some of their advantages analyzed.

A first example is provided by a TEC with temporal pin-efficiency slightly larger than one. This TEC uses the 8b8w code as its vector signaling code. This code has 420 elements, which means that 17 bits can be encoded uniquely into pairs of elements of this code. This new code, which we call the 8b8w-2 code, can be used to achieve a TEC with temporal pin-efficiency larger than 1 if a transition event is to occur every t=2n+1 time instances, for some positive integer n. To this end, the first 2n time instances after a transition event are used to encode 17n bits into n pairs of the 8b8w-2 code. These pairs are sent over the 8 communication wires in 2n time instances. At the transition event, i.e., at time instance 2n+1, two additional bits are sent in a manner similar to steps 2125 and 2130 of the process depicted in FIG. 21. In total, the temporal pin-efficiency of this scheme is (17n+2)/(16n+8). For values of n larger than 6, this temporal pin-efficiency is larger than 1.

In a second example, TEC may be combined with TLC to obtain a transmission scheme in which the transitions are limited, hence the vertical eye openings are larger, and at the same time transitions are enforced over all communication wires within every t time instances. An example is provided by the 8b10w TLC introduced above. The codewords sent over the wires belong to the set formed by the 1260 distinct permutations of the generating vector (+1, +1, −1, −1, 0, 0, 0, 0, 0, 0). The driver power used for transmitting codewords of this code is equal to that of 4 DS links, as described before.

The combined TEC and TLC works now as follows: for the first t−1 time intervals the TLC code described above with index generator 630 in FIG. 16 is used. In the t-th time interval, 6 bits are grabbed off the input stream, and the process of FIG. 17 is used to produce four indices r[0], ..., r[3] in the set {0, 1, 2, 3, 4, 5, 6}. Next, the positions z[0], ..., z[5] of the 6 zeros of the previous codeword are either calculated or read off the state memory. The wires with indices z[r[0]] and z[r[1]] may now carry the value −1, and the wires with indices z[r[2]] and z[r[3]] may now carry the value +1. In this scheme, it is guaranteed that a wire carrying a +1 or a −1 switches its state at least every t time instances. The temporal pin-efficiency of this scheme is (8t−2)/10t, which is very close to 80% for reasonable values of t. The combined TLC and TEC has thus almost the same temporal pin-efficiency and eye-opening as the TLC, and in addition it enforces transitions on nonzero-wires at least every t time instances.

It is also possible to extend the previous scheme to make sure that all the wires make a transition every t time instances. This may be done by performing the above transition event at time instance t−2, and memorizing the two positions of the wires which transmit zeros at time instances t−2 and t−1. Thereafter, these two wires will make a forced transition to a +1 or a −1. With this enforcement, the number of bits transmitted at time instance t is at least 5. In total, this scheme will therefore lead to a temporal pin-efficiency of (8(t−2)+11)/10t, which is (8t−5)/10t. For reasonable values of t, this is still close to 80%. This combined TLC and TEC scheme has thus almost the same temporal pin-efficiency and eye-opening as the TLC, and in addition it enforces transitions on all wires at least every t time instances.

APPENDIX I

This Appendix I contains a C implementation of the process illustrated in FIG. 16.

```
int Mod(int a, int b)
{int c=a % b;
   while (c<0) c+=b;
   return c;}
void Encode(int *q, int *b, int *m, int *p)
{
int res[4];
if (b[7]==0)
   {
m[b[6]]=q[0];
m[INV(b[6])]=q[1+b[0]+2*b[1]];
if (b[2]&b[3]==0)
   {
   p[0]=q[2+((b[0]+2*b[1]+b[2]+2*b[3]) % 4)];
   p[1]=q[6+b[4]+2*b[5]];
   }
else // b[2]=b[3]=1
   {
   p[0]=q[6+((1+b[4]+2*b[5]) % 4)];
   p[1]=q[6+b[4]+2*b[5]];
   }
   }
else // b[7]=1
   {
if (b[6]==0)
   {
   Enc6b6w(b,res);
   m[0]=q[2+res[0]]; m[1]=q[2+res[1]];
   p[0]=q[2+res[2]]; p[1]=q[2+res[3]];
   }
else // b[6]=1
   {
   int A, B;
      A=(b[0]+2*b[1]+4*b[2])/3;
      B=(b[0]+2*b[1]+4*b[2]) % 3;
   m[0]=q[2+A]; m[1]=q[5+B];
   p[b[5]]=q[8];
   int C=(b[4]==0 ? A:B);
   p[INV(b[5])]=q[2+3*b[4]+Mod(C+(b[3]==0? 1:−1), 3)];
   }
   }
}
```

APPENDIX II

This Appendix II contains a C implementation of the process in FIG. 17.

```
void Enc6b6w(int *b, int *res)
{
int n=b[0]+b[1]*2+b[2]*4;
int A=n/3, B=n % 3;
if (b[5]==1)
    {
res[0]=2*B;
res[1]=2*A+1;
res[2]=(2*B+2*b[3]) % 6;
res[3]=(2*A+3+2*b[4]) % 6;
    }
else // b[5]=0
    {
res[2*b[3]]=2*B;
res[2*b[3]+1]=2*A+1;
if (b[4]==0)
      {
    res[2*(INV(b[3]))]=(2*B+2) % 6;
    res[2*(INV(b[3]))+1]=(2*B+4) % 6;
      }
else // b[4]=1
      {
    res[2*(INV(b[3]))]=(2*A+3) % 6;
    res[2*(INV(b[3]))+1]=(2*A+5) % 6;
      }
    }
}
```

What is claimed is:

1. In a chip-to-chip communication system, a method for transmitting data over a plurality of transmission wires, comprising:
   receiving a plurality of bits representing the data to be transmitted;
   generating a vector signaling code codeword based on the received plurality of bits and a stored state, wherein the vector signaling code codeword is a codeword in a vector signaling code wherein the vector signaling code comprises a finite set of vectors with entries being real numbers such that the sum of the coordinates of each codeword is a constant over the finite set of vectors and where, for at least one coordinate position, at least three codewords have unique values in the at least one coordinate position among the at least three codewords;
   updating the stored state for a time instance, such that the updated stored state is usable in generating a subsequent vector signaling code codeword dependent at least on that updated stored state; and
   outputting a representation of the codeword over the plurality of transmission wires in each of a plurality of periods.

2. The method of claim 1, wherein each vector signaling code codeword is a permutation of one vector and the finite set of vectors comprises all possible permutations of the one vector.

3. The method of claim 1, wherein each vector signaling code codeword is a sum of a distinct permutation of at least two different vectors and the finite set of vectors comprises all possible sums of all distinct permutations of the at least two different vectors.

4. The method of claim 1, wherein the state information is a vector comprising the values transmitted on the wires in a time instance.

5. The method of claim 1, wherein the state information comprises a plurality of vectors comprising the values transmitted on the wires during several of the last time instances.

6. The method of claim 1, wherein the data to be transmitted comprises bits.

7. The method of claim 1, wherein generating a vector signaling code codeword further comprises:
   reading the data to be transmitted;
   reading available state information; and
   computing a codeword from the data to be transmitted and the available state information using a pre-defined function.

8. The method of claim 1, wherein the vector signaling code has at least one vector signaling code codeword with at least two components having the same value.

9. In a chip-to-chip communication system, a method for receiving data over a plurality of transmission wires, comprising:
   receiving a plurality of signals representing the data received;
   generating a vector signaling code codeword based on the received plurality of signals and a stored state, wherein the vector signaling code codeword is a codeword in a vector signaling code wherein the vector signaling code comprises a finite set of vectors with entries being real numbers such that the sum of the coordinates of each codeword is a constant over the finite set of vectors and where, for at least one coordinate position, at least three codewords have unique values in the at least one coordinate position among the at least three codewords;
   updating the stored state for a time instance, such that the updated stored state is usable in generating a subsequent vector signaling code codeword dependent at least on that updated stored state and subsequently received pluralities of signals; and
   outputting a representation of data corresponding to the signals received over the plurality of transmission wires in each of a plurality of periods.

10. The method of claim 9, wherein each vector signaling code codeword is a permutation of one vector and the finite set of vectors comprises all possible permutations of the one vector.

11. The method of claim 9, wherein each vector signaling code codeword is a sum of a distinct permutation of at least two different vectors and the finite set of vectors comprises all possible sums of all distinct permutations of the at least two different vectors.

12. The method of claim 9, wherein the state information is a vector comprising the values transmitted on the wires in a time instance.

13. The method of claim 9, wherein the state information comprises a plurality of vectors comprising the values transmitted on the wires during several of the last time instances.

14. The method of claim 9, wherein generating a vector signaling code codeword further comprises:
   reading the received data;
   reading available state information; and
   computing a codeword from the data to be transmitted and the available state information using a pre-defined function.

15. The method of claim 9, wherein the vector signaling code has at least one vector signaling code codeword with at least two components having the same value.

16. In a chip-to-chip communication system, a method for transmitting data over a plurality of transmission wires, comprising:

receiving a plurality of bits representing the data to be transmitted;

determining a vector signaling code set, the vector signaling code set comprises a finite set of vectors each corresponding to a codeword, wherein each codeword in the finite set comprises a plurality of components each having a coordinate value wherein the sum of coordinate values is a constant over the finite set of vectors and, for at least one component, at least three codewords in the finite set of vectors have unique coordinate values for the at least one component among the at least three codewords;

generating a vector signaling code codeword based on the received plurality of bits and a stored state;

updating the stored state for a time instance, such that the updated stored state is usable in generating a subsequent vector signaling code codeword dependent at least on that updated stored state; and outputting a representation of the codeword over the plurality of transmission wires in each of a plurality of periods.

* * * * *